(12) United States Patent
Dorenbos et al.

(10) Patent No.: US 10,564,298 B2
(45) Date of Patent: Feb. 18, 2020

(54) METHOD OF FORMING A SCINTILLATION CRYSTAL AND A RADIATION DETECTION APPARATUS INCLUDING A SCINTILLATION CRYSTAL INCLUDING A RARE EARTH HALIDE

(71) Applicants: Stichting Voor De Technische Wetenschappen, JP Utrecht (NL); Universite De Berne, Berne (CH)

(72) Inventors: Pieter Dorenbos, GM Rijswijk (NL); Karl W. Krämer, Berne (CH)

(*) Notice: Subject to any disclaimer, the term of this patent is extended or adjusted under 35 U.S.C. 154(b) by 0 days.

(21) Appl. No.: 16/225,193

(22) Filed: Dec. 19, 2018

(65) Prior Publication Data

US 2019/0146102 A1 May 16, 2019

Related U.S. Application Data

(63) Continuation of application No. 15/077,042, filed on Mar. 22, 2016, now Pat. No. 10,203,421, which is a
(Continued)

(51) Int. Cl.
*G01T 1/202* (2006.01)
*G21K 4/00* (2006.01)
(Continued)

(52) U.S. Cl.
CPC ........ *G01T 1/2023* (2013.01); *C09K 11/7772* (2013.01); *C09K 11/7773* (2013.01);
(Continued)

(58) Field of Classification Search
CPC . G01T 1/2023; G01T 1/2006; C09K 11/7772; C09K 11/7773; G21K 4/00; G21K 2004/06
See application file for complete search history.

(56) References Cited

U.S. PATENT DOCUMENTS 4,835,398 A   5/1989  Nakamura
5,039,858 A   8/1991  Anderson et al.
(Continued)

FOREIGN PATENT DOCUMENTS

CN    1404522 A    3/2003
CN  103687928 A    3/2014
(Continued)

OTHER PUBLICATIONS

Harrison et al., Aliovalent Doping of CeBr3, 2010, SPIE, vol. 7806, pp. 1-14 (Year: 2010).*
(Continued)

*Primary Examiner* — Christine S. Kim

(57) ABSTRACT

A scintillation crystal can include $Ln_{(1-y)}RE_yX_3$, wherein Ln represents a rare earth element, RE represents a different rare earth element, y has a value in a range of 0 to 1, and X represents a halogen. In an embodiment, the scintillation crystal is doped with a Group 1 element, a Group 2 element, or a mixture thereof, and the scintillation crystal is formed from a melt having a concentration of such elements or mixture thereof of at least approximately 0.02 wt. %. In another embodiment, the scintillation crystal can have unexpectedly improved proportionality and unexpectedly improved energy resolution properties. In a further embodiment, a radiation detection apparatus can include the scintillation crystal, a photosensor, and an electronics device. Such a radiation detection apparatus can be useful in a variety of applications.

16 Claims, 6 Drawing Sheets

Related U.S. Application Data continuation of application No. 14/064,981, filed on Oct. 28, 2013, now abandoned.

(60) Provisional application No. 61/719,405, filed on Oct. 28, 2012.

(51) Int. Cl.
*C09K 11/77* (2006.01)
*G01T 1/20* (2006.01)

(52) U.S. Cl.
CPC .............. *G01T 1/2006* (2013.01); *G21K 4/00* (2013.01); *G21K 2004/06* (2013.01)

(56) References Cited

U.S. PATENT DOCUMENTS

| | | | |
|---|---|---|---|
| 5,168,540 A | 12/1992 | Winn et al. | |
| 6,043,525 A | 3/2000 | Chen | |
| 6,201,270 B1 | 3/2001 | Chen | |
| 6,872,937 B2 * | 3/2005 | Williams | G01V 5/08 |
| | | | 250/256 |
| 7,365,333 B1 | 4/2008 | Shah et al. | |
| 7,405,404 B1 | 7/2008 | Shah | |
| 7,479,637 B2 | 1/2009 | Dorenbos et al. | |
| 7,608,828 B2 | 10/2009 | Yoshikawa et al. | |
| 7,655,919 B1 | 2/2010 | Shah et al. | |
| 7,692,153 B2 | 4/2010 | Shimizu et al. | |
| 7,755,054 B1 | 7/2010 | Shah et al. | |
| 7,863,572 B1 | 1/2011 | Doty | |
| 8,153,983 B1 | 4/2012 | Shah et al. | |
| 8,179,461 B2 | 5/2012 | Suzuki et al. | |
| 8,299,436 B2 | 10/2012 | Srivastava et al. | |
| 8,519,339 B2 | 8/2013 | Flamanc et al. | |
| 8,575,553 B1 | 11/2013 | Shah et al. | |
| 8,629,403 B2 | 1/2014 | Vyprintsev | |
| 8,829,445 B1 | 9/2014 | Nagarkar | |
| 8,957,386 B1 | 2/2015 | Nagarkar et al. | |
| 9,796,922 B2 | 10/2017 | Menge et al. | |
| 2005/0082484 A1 | 4/2005 | Srivastava et al. | |
| 2006/0250513 A1 | 11/2006 | Yamamoto et al. | |
| 2007/0001098 A1 | 1/2007 | Sano | |
| 2007/0001118 A1 | 1/2007 | Srivastava et al. | |
| 2007/0210256 A1 | 9/2007 | Dorenbos et al. | |
| 2007/0272898 A1 | 11/2007 | Yoshikawa et al. | |
| 2008/0011953 A1 | 1/2008 | Srivastava et al. | |
| 2008/0067391 A1 * | 3/2008 | Shimizu | C01F 17/0056 |
| | | | 250/361 R |
| 2008/0296503 A1 | 12/2008 | Srivastava et al. | |
| 2009/0278052 A1 | 11/2009 | Frank et al. | |
| 2010/0163735 A1 | 7/2010 | Menge et al. | |
| 2010/0201856 A1 | 8/2010 | Hayashi et al. | |
| 2010/0268074 A1 | 10/2010 | Van Loef et al. | |
| 2011/0017911 A1 | 1/2011 | Flamanc et al. | |
| 2011/0025871 A1 | 2/2011 | Yoshioka | |
| 2011/0293499 A1 | 12/2011 | Iltis | |
| 2012/0305778 A1 | 12/2012 | Menge et al. | |
| 2014/0117242 A1 | 5/2014 | Dorenbos et al. | |
| 2016/0122639 A1 | 5/2016 | Menge et al. | |
| 2018/0327663 A1 | 11/2018 | Menge et al. | |

FOREIGN PATENT DOCUMENTS

| | | |
|---|---|---|
| CN | 105102583 B | 12/2017 |
| EP | 1930394 A2 | 6/2008 |
| EP | 2308949 A1 | 4/2011 |
| JP | H05247462 A | 9/1993 |
| JP | 2008101180 A | 5/2008 |
| WO | 2005100645 A1 | 10/2005 |
| WO | 2007120441 A2 | 10/2007 |
| WO | 2011133545 A1 | 10/2011 |
| WO | 2012170390 A2 | 12/2012 |

OTHER PUBLICATIONS

International Search Report for PCT/US2013/067103, dated Dec. 26, 2013 1 page.

Harrison, Mark J. et al., "Scintillation Performance of Aliovalently-Doped CeBr3". IEEE Transactions on Nuclear Science, vol. 56, No. 3, Jun. 2009, pp. 1661-1665.

Harrison, M. J. et al. "Initial Investigation of Strengthening Agents for Lanthanide Halide Scintillators." Penetrating Radiation Systems and Applications VIII, Proc. of SPIE vol. 6707, 67070B1-67070B10, (2007).

Nikl, Martin et al., "Development of novel scintillator crystals," Journal of Crystal Growth, vol. 292, dated 2006, pp. 416-421.

European Search Report for EP Application No. 12797342.8, dated Nov. 4, 2014, 1 page.

Foll, Dr. Helmut, "6.1.2 Silicon Crystal Growth and Waiter Production," Electronic Materials—Script, U. of Kiel, pp. 252-255 (2007).

Nicoara, Irina et al., "Growth and Characterization of Doped CaF2 Crystals," Modem Aspects of Bulk Crystal and Thin Film Preparation, Ed. Dr. Nikolai Kolesnikov, ISBN: 978-953-307-610-2, InTech, 2012, 27 pages.

Scheel, Hans J., "Theoretical and Experimental Solutions of the Striation Problem," Crystal Growth Technology, Ed. H.J. Scheel and T. Fukuda, 2003, John Wiley & Sons, Ltd., 24 pages.

Pei, Yu et al. "Scintillation Characteristics of Rare-earth Halide (LnX3) Crystals," Journal of Synthetic Crystals, vol. 33, No. 6, Dec. 2004, pp. 1004-1010 (abstract only).

International Search Report for PCT/US2012/040855, dated Jan. 31, 2013, 1 page.

Supplementary Partial European Search Report for EP Application No. 13849213, dated Sep. 8, 2016, 1 page.

Alekhin, Mikhail, S. et al., "Improvement of LaBr3:5%Ce Scintillation Properties by Li+, Na+, Mg2+, Ca2+, Sr2+, and Ba2+ Co-Doping," Journal of Applied Physics, vol. 113, 2013, pp. 224904-1-224904-7.

Sze, S.M., "CZ Crystal Growth." VL SI Technology, McGraw-Hill Book Company, vol. 566, 1983, pp. 24-29.

U.S. Appl. No. 13/488,756, filed Jun. 5, 2012, Inventors: Peter R. Menge et al.

* cited by examiner

METHOD OF FORMING A SCINTILLATION CRYSTAL AND A RADIATION DETECTION APPARATUS INCLUDING A SCINTILLATION CRYSTAL INCLUDING A RARE EARTH HALIDE

CROSS-REFERENCE TO RELATED APPLICATIONS

This application is a continuation of and claims priority under 35 U.S.C. § 120 to U.S. patent application Ser. No. 15/077,042, entitled "Method of Forming a Scintillation Crystal and a Radiation Detection Apparatus Including a Scintillation Crystal Including a Rare Earth Halide," by Dorenbos et al., filed Mar. 22, 2016, which is a continuation of and claims priority under 35 U.S.C. § 120 to U.S. patent application Ser. No. 14/064,981, entitled "Radiation Detection Apparatus Including a Scintillation Crystal Including a Rare Earth Halide," by Dorenbos et al., filed Oct. 28, 2013, which is a non-provisional application that claims priority under 35 U.S.C. § 119(e) to U.S. Provisional Patent Application No. 61/719,405, entitled "Scintillation Crystal Including a Rare Earth Halide, and a Radiation Detection Apparatus Including the Scintillation Crystal," by Dorenbos et al., filed Oct. 28, 2012, all of which are incorporated herein by reference in their entireties.

FIELD OF THE DISCLOSURE

The present disclosure is directed to scintillation crystals including rare earth halides and radiation detection apparatuses including such scintillation crystals.

BACKGROUND

Radiation detection apparatuses are used in a variety of applications. For example, scintillators can be used for medical imaging and for well logging in the oil and gas industry as well for the environment monitoring, security applications, and for nuclear physics analysis and applications. Scintillation crystals used for radiation detection apparatuses can include rare earth halides. Further improvement of scintillation crystals is desired.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "averaged," when referring to a value, is intended to mean an average, a geometric mean, or a median value.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

Figure 1:
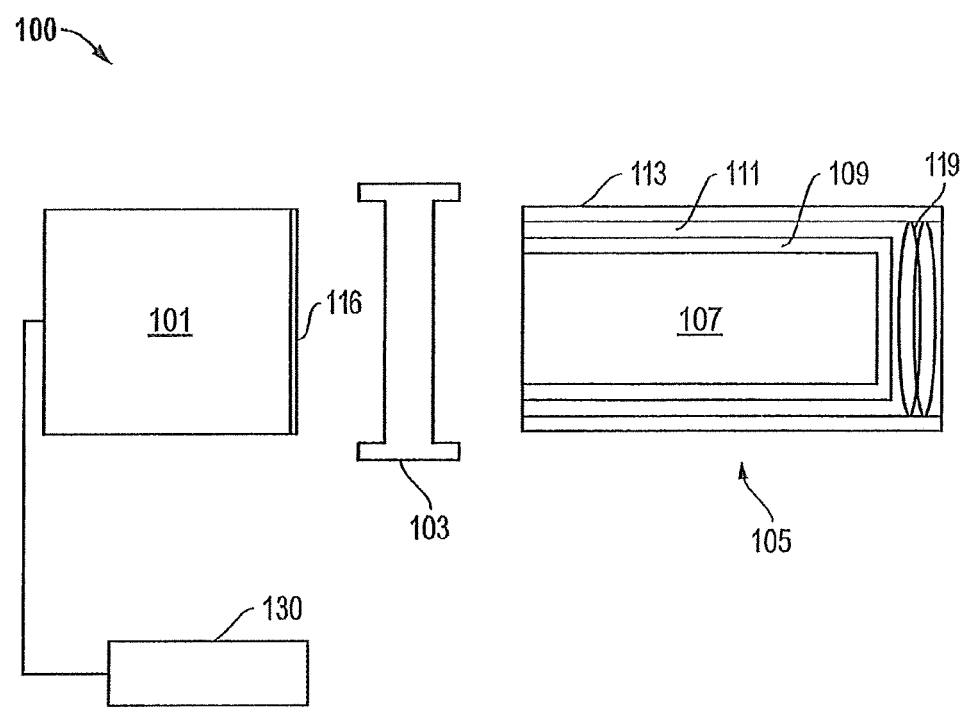
FIG. 1 includes an illustration of a radiation detection apparatus in accordance with an embodiment.

FIG. 1 illustrates an embodiment of a radiation detection apparatus system 100. The radiation detection apparatus system can be a medical imaging apparatus, a well logging apparatus, a security inspection apparatus, nuclear physics applications, or the like. In a particular embodiment, the radiation detection apparatus can be used for gamma ray analysis, such as a Single Positron Emission Computer Tomography (SPECT) or Positron Emission Tomography (PET) analysis.

In the embodiment illustrated, the radiation detection apparatus 100 includes a photosensor 101, an optical interface 103, and a scintillation device 105. Although the photosensor 101, the optical interface 103, and the scintillation device 105 are illustrated separate from each other, skilled artisans will appreciate that photosensor 101 and the scintillation device 105 can be coupled to the optical interface 103, with the optical interface 103 disposed between the photosensor 101 and the scintillation device 105. The scintillation device 105 and the photosensor 101 can be optically coupled to the optical interface 103 with other known coupling methods, such as the use of an optical gel or bonding agent, or directly through molecular adhesion of optically coupled elements.

The photosensor 101 may be a photomultiplier tube (PMT), a semiconductor-based photomultiplier, or a hybrid photosensor. The photosensor 101 can receive photons emitted by the scintillation device 105, via an input window 116, and produce electrical pulses based on numbers of photons that it receives. The photosensor 101 is electrically coupled to an electronics module 130. The electrical pulses can be shaped, digitized, analyzed, or any combination thereof by the electronics module 130 to provide a count of the photons received at the photosensor 101 or other information. The electronics module 130 can include an amplifier, a pre-amplifier, a discriminator, an analog-to-digital signal converter, a photon counter, another electronic component, or any combination thereof. The photosensor 101 can be housed within a tube or housing made of a material capable of protecting the photosensor 101, the electronics module 130, or a combination thereof, such as a metal, metal alloy, other material, or any combination thereof.

The scintillation device 105 includes a scintillation crystal 107. The composition of the scintillation crystal 107 will be described in more detail later in this specification. The scintillation crystal 107 is substantially surrounded by a reflector 109. In one embodiment, the reflector 109 can include polytetrafluoroethylene (PTFE), another material adapted to reflect light emitted by the scintillation crystal 107, or a combination thereof. In an illustrative embodiment, the reflector 109 can be substantially surrounded by a shock absorbing member 111. The scintillation crystal 107, the reflector 109, and the shock absorbing member 111 can be housed within a casing 113.

The scintillation device 105 includes at least one stabilization mechanism adapted to reduce relative movement between the scintillation crystal 107 and other elements of the radiation detection apparatus 100, such as the optical interface 103, the casing 113, the shock absorbing member 111, the reflector 109, or any combination thereof. The stabilization mechanism may include a spring 119, an elastomer, another suitable stabilization mechanism, or a combination thereof. The stabilization mechanism can be adapted to apply lateral forces, horizontal forces, or a combination thereof, to the scintillation crystal 107 to stabilize its position relative to one or more other elements of the radiation detection apparatus 100.

As illustrated, the optical interface 103 is adapted to be coupled between the photosensor 101 and the scintillation device 105. The optical interface 103 is also adapted to facilitate optical coupling between the photosensor 101 and the scintillation device 105. The optical interface 103 can include a polymer, such as a silicone rubber, that is polarized to align the reflective indices of the scintillation crystal 107 and the input window 116. In other embodiments, the optical interface 103 can include gels or colloids that include polymers and additional elements.

The scintillation crystal 107 can include a rare earth halide. As used herein, rare earth elements include Y, Sc, and the Lanthanide series elements. In an embodiment, the scintillation crystal 107 can include one or more other rare earth elements. Thus, the scintillation crystal 107 can have chemical formula as set forth below.

$Ln_{(1-y)}RE_yX_3$, wherein:

Ln represents a rare earth element;
RE represents a different rare earth element;
y has a value in a range of 0 to 1 formula unit ("f.u."); and
X represents a halogen.

In particular embodiment, Ln can include La, Gd, Lu, or any mixture thereof; and RE can include Ce, Eu, Pr, Tb, Nd, or any mixture thereof. In a particular embodiment, the scintillation crystal 107 can be $La_{(1-y)}Ce_yBr_3$. In particular embodiments, $LaBr_3$ and $CeBr_3$ are within the scope of compositions described.

In another a further embodiment y can be 0 f.u., at least approximately 0.0001 f.u., at least 0.001 f.u., or at least approximately 0.05 f.u. In a further embodiment, y may be 1 f.u., no greater than approximately 0.2 f.u., no greater than approximately 0.1 f.u., no greater than approximately 0.05 f.u, or no greater than approximately 0.01 f.u. In a particular embodiment, y is in a range of approximately 0.01 f.u. to approximately 0.1 f.u. In a further embodiment, y is no greater than approximately 0.99 f.u., no greater than approximately 0.9 f.u., or no greater than approximately 0.8 f.u. X can include a single halogen or any mixture of halogens. For example, X can include Br, I, or any mixture thereof.

The rare earth halide can further include a co-dopant or a dopant including a Group 1, a Group 2 element, or any mixture thereof. Group 1 elements can include Li, Na, Rb, Cs, or any mixture thereon. In a particular embodiment, the Group 1 element is Na. Group 2 elements can include Mg, Ca, Sr, Ba, or any mixture thereon. In a particular embodiment, the Group 2 element is Ca or Sr. A crystal that includes $LaBr_3$ co-doped with Ce and Sr has a peak emission that is at a longer wavelength as compared to a crystal that includes $LaBr_3$ doped with Ce. Further, when $La_{(1-y)}Ce_yBr_3$ is doped with Sr, the light output can be more constant than $La_{(1-y)}Ce_yBr_3$ over the range of −40° C. to 175° C., and is brighter than $La_{(1-y)}Ce_yBr_3$ at temperatures higher than 50° C. Thus, $La_{(1-y)}Ce_yBr_3$ is doped with Sr may be useful for applications that involve extreme temperature excursions, such as oil well logging and space applications. Similar to $La_{(1-y)}Ce_yBr_3$, $CeBr_3$ doped with Sr is brighter than $CeBr_3$ at temperatures higher than 50° C. When $La_{(1-y)}Ce_yBr_3$ is doped with Ba, the light output may be higher than the light output of $La_{(1-y)}Ce_yBr_3$ over the range of room temperature (approximately 22° C.) to about 70° C. $La_{(1-y)}Ce_yBr_3$ is doped with Ba may be useful for outdoor applications, for example for port-of-entry detectors that can be used for vehicles and cargo.

In a further embodiment, the co-dopant or dopant can include at least two different Group 1 elements, at least two different Group 2 elements, or at least one Group 1 element and at least one Group 2 element. In an embodiment, the content of the co-dopant or dopant can be measured as the amount of co-dopant or dopant in a melt used to form the rare earth halide. The co-dopant or dopant concentration in the melt can be at least approximately 0.02 wt. %, or in particular at least approximately 0.08 wt. %, at least approximately 0.2 wt. %, or more particularly at least approximately 0.3 wt. %, or even more particularly 0.4 wt. %. In another embodiment, the co-dopant or dopant concentration in the melt may be no greater than approximately 1.0 wt. %, or in particular no greater than approximately 0.9 wt. %, or more particularly no greater than approximately 0.7 wt. %. In a particular embodiment, the co-dopant or dopant concentration in the melt can be in a range approximately 0.2 wt. % to approximately 0.9 wt. % or more particularly, in a range of approximately 0.3 wt. % to 0.7 wt. %.

The starting materials can include metal halides of the same halogen or different halogens. For example, a rare earth bromide and $SrBr_2$ or NaBr can be used. In another embodiment, some of the bromide-containing compounds may be replaced with iodide-containing compounds. The scintillation crystal can be formed using a conventional technique from a melt. The method can include the Bridgman method, Czochralski crystal growth method, or Kyropolis growth method.

Scintillation crystals that include a Group 1 element-doped or a Group 2 element-doped rare earth halide having concentrations as previously described provide good scintillating properties, including energy resolution at energies in a range of 10 keV to 2000 keV. In another embodiment, co-doped or doped rare earth halides can provide unexpected results as compared to other rare earth halide scintillation crystals, particularly at low energies. In a particular embodiment, the lower energies can be in a range of approximately 10 keV to approximately 60 keV. More particularly, the Group 2 element-doped scintillation crystals have unusually good proportionality at lower energies, and the Group 1 element-doped and Group 2 element-doped scintillation crystals have good energy resolution over a wide range of energies. The range of 10 keV to 356 keV can be further divided into ranges of approximately 10 keV to 30 keV, 30 keV to 60 keV, 60 keV to 356 keV. The range of 356 keV to 1332 keV is also examined. While improved performance occurs within each of the ranges, the relative improvement may be more significant for the range of 10 to 60 keV, as compared to the range of 356 keV to 1332 keV or even higher energies. The better performance at lower energies is particularly significant for medical imaging applications. The scintillation crystals can be used in other applications, such as well logging in the oil and gas industry as well for the environment monitoring, security applications, and for nuclear physics analysis and applications.

Energy resolution is the energy range at full-width of half maximum ("FWHM") divided by the energy corresponding to the peak, expressed as a percent. A lower number for energy resolution means that the peak can be resolved more readily. Values for energy resolution may depend on the metrology equipment and the measurement techniques.

In an embodiment, measurements for energy resolution may be performed on scintillation crystals that varied in size from approximately 0.01 $cm^3$ to approximately 0.2 $cm^3$. The crystals can be wrapped with a reflector on the sides and one end. Alternatively, the crystals may be placed on a window of a PMT and covered with the reflector. In a particular embodiment, the reflector may be a specular reflector or a diffuse reflector. For example, the reflector may include an aluminum foil, aluminized polyester (e.g. aluminized Mylar™-brand polyester), or a polytetrafluoroethylene ("PTFE") sheet reflector. The scintillation crystal can be placed in a housing where scintillating light passes through a sapphire or quartz window.

The housed scintillation crystal can be interfaced to a PMT. In an embodiment, the PMT can be a non-saturated photomultiplier. By non-saturated, the photomultiplier operates in a mode in which significantly more electrons may be generated with a significantly higher rate of photons striking the photocathode of the photomultiplier. An exemplary PMT can be a Hamamatsu Model R1791 PMT (available from Hamamatsu Photonics Deutschland GmbH of Herrsching am Ammersee, DE) run at 400 V. One or more desired isotopes that emit radiation can be placed one at a time at a predetermined distance, for example, approximately 150 mm (6 inches), from the sample. The energy spectra of each isotope and each crystal can be obtained from an ORTEC Model 672 spectroscopic amplifier (available from AMETEK GmbH of Meerbusch, DE) with a 10 μs shaping time.

In another embodiment, different equipment may be used. For example, a PMT can be Model 9305 from ET Enterprises Ltd. of Uxbridge, U.K., run at 900 V. The energy spectra of each isotope and each crystal can be obtained from a multi-channel analyzer that performs bi-polar shaping at a 0.25 micro-s shaping time. An exemplary multi-channel analyzer can be obtained from Canberra Industries Inc. of Meriden Conn., model Aptec 55008 that has bi-polar shaping, 0.25 micro-s shaping time, and 11-bit digitization. After reading this specification, skilled artisans will be able to select metrology equipment for their particular applications.

After reading this specification, skilled artisans will appreciate that the energy resolution values that they obtain may change if the metrology equipment and the measurement techniques are changed. The energy resolution values described below can be obtained using the previously described metrology equipment and the measurement conditions to provide a more accurate comparison of energy resolution values between different samples.

Energy resolution ratio ("ER Ratio") may be used to compare the energy resolutions of different compositions of materials for a particular energy or range of energies. ER Ratio can allow for a better comparison as opposed to energy resolution because ER Ratios can be obtained using substantially the same metrology equipment and techniques. Thus, variations based on metrology equipment and techniques can be substantially eliminated.

In an embodiment, the ER Ratio is the energy resolution of a particular crystal at a particular energy or range of energies divided by the energy resolution of another crystal at substantially the same energy or range of energies, wherein the energy spectra for the crystals are obtained using the same or substantially identical metrology equipment and techniques. In an embodiment, $LaBr_3$:Ce crystals having a co-dopant may be compared to $LaBr_3$:Ce crystals without a co-dopant. In another embodiment, a doped $CeBr_3$ crystal can be compared to a substantially undoped $CeBr_3$ crystal.

When comparing a particular scintillation crystal having a composition described herein to a different scintillation crystal having a different composition, a lower ER Ratio allows for more accurate detection of energy peaks. When comparing the scintillation crystals for particular energies, the ER Ratio may be no greater than approximately 0.95 for an energy of 8 keV. In another embodiment, the ER Ratio may be no greater than approximately 0.88, or more particularly, no greater than 0.80 for an energy of 8 keV. In a further embodiment, the ER Ratio may be in a range of approximately 0.79 to approximately 0.95 or more particularly, in a range of approximately 0.79 to approximately 0.86 for an energy of 8 keV. At an energy of 13 keV, the ER Ratio may be no greater than approximately 0.95. In another embodiment, the ER Ratio may be no greater than approximately 0.88, or more particularly, no greater than 0.80 for an energy of 13 keV. In a further embodiment, the ER Ratio may be in a range of approximately 0.78 to approximately 0.95 or more particularly, in a range of approximately 0.79 to approximately 0.88 for an energy of 13 keV.

At an energy of 17 keV, the ER Ratio may be no greater than approximately 0.95. In another embodiment, the ER Ratio may be no greater than approximately 0.90, or more particularly, no greater than 0.80 for an energy of 17 keV. In a further embodiment, the ER Ratio may be in a range of approximately 0.76 to approximately 0.95 or more particularly, in a range of approximately 0.78 to approximately 0.90 for an energy of 17 keV. At an energy of 22 keV, the ER Ratio may be no greater than approximately 0.95. In another embodiment, the ER Ratio may be no greater than approximately 0.90, or more particularly, no greater than 0.87 for an energy of 22 keV. In a further embodiment, the ER Ratio may be in a range of approximately 0.84 to approximately 0.95 or more particularly, in a range of approximately 0.85 to approximately 0.90 for an energy of 22 keV.

At an energy of 26 keV, the ER Ratio may be no greater than approximately 0.95. In another embodiment, the ER Ratio may be no greater than approximately 0.86, or more particularly, no greater than 0.80 for an energy of 26 keV. In a further embodiment, the ER Ratio may be in a range of approximately 0.75 to approximately 0.95 or more particularly, in a range of approximately 0.77 to approximately 0.90 for an energy of 26 keV. At an energy of 32 keV, the ER Ratio may be no greater than approximately 0.95. In another embodiment, the ER Ratio may be no greater than approximately 0.90, or more particularly, no greater than 0.80 for an energy of 32 keV. In a further embodiment, the ER Ratio may be in a range of approximately 0.75 to approximately 0.95 or more particularly, in a range of approximately 0.76 to approximately 0.90 for an energy of 32 keV.

At an energy of 44 keV, the ER Ratio may be no greater than approximately 0.97. In another embodiment, the ER Ratio may be no greater than approximately 0.88, or more particularly, no greater than 0.80 for an energy of 44 keV. In a further embodiment, the ER Ratio may be in a range of approximately 0.70 to approximately 0.97 or more particularly, in a range of approximately 0.73 to approximately 0.85 for an energy of 44 keV. At an energy of 60 keV, the ER Ratio may be no greater than approximately 0.95. In another embodiment, the ER Ratio may be no greater than approximately 0.90, or more particularly, no greater than 0.80 for an energy of 60 keV. In a further embodiment, the ER Ratio may be in a range of approximately 0.70 to approximately 0.95 or more particularly, in a range of approximately 0.76 to approximately 0.91 for an energy of 60 keV.

At an energy of 81 keV, the ER Ratio may be no greater than approximately 0.95. In another embodiment, the ER Ratio may be no greater than approximately 0.90, or more particularly, no greater than 0.81 for an energy of 81 keV. In a further embodiment, the ER Ratio may be in a range of approximately 0.75 to approximately 0.95 or more particularly, in a range of approximately 0.79 to approximately 0.90 for an energy of 81 keV. At an energy of 276 keV, the ER Ratio may be no greater than approximately 0.95. In another embodiment, the ER Ratio may be no greater than approximately 0.85, or more particularly, no greater than 0.75 for an energy of 276 keV. In a further embodiment, the ER Ratio may be in a range of approximately 0.70 to approximately 0.95 or more particularly, in a range of approximately 0.73 to approximately 0.85 for an energy of 276 keV.

At an energy of 303 keV, the ER Ratio may be no greater than approximately 0.95. In another embodiment, the ER Ratio may be no greater than approximately 0.88, or more particularly, no greater than 0.83 for an energy of 303 keV. In a further embodiment, the ER Ratio may be in a range of approximately 0.80 to approximately 0.95 or more particularly, in a range of approximately 0.81 to approximately 0.90 for an energy of 303 keV. At an energy of 356 keV, the ER Ratio may be no greater than approximately 0.95. In another embodiment, the ER Ratio may be no greater than approximately 0.90, or more particularly, no greater than 0.85 for an energy of 356 keV. In a further embodiment, the ER Ratio may be in a range of approximately 0.80 to approximately 0.95 or more particularly, in a range of approximately 0.81 to approximately 0.86 for an energy of 356 keV.

At an energy of 384 keV, the ER Ratio may be no greater than approximately 0.95. In another embodiment, the ER Ratio may be no greater than approximately 0.90, or more particularly, no greater than 0.85 for an energy of 384 keV. In a further embodiment, the ER Ratio may be in a range of approximately 0.80 to approximately 0.95 or more particularly, in a range of approximately 0.81 to approximately 0.88 for an energy of 384 keV. At an energy of 511 keV, the ER Ratio may be no greater than approximately 0.95. In another embodiment, the ER Ratio may be no greater than approximately 0.88, or more particularly, no greater than 0.83 for an energy of 511 keV. In a further embodiment, the ER Ratio may be in a range of approximately 0.78 to approximately 0.95 or more particularly, in a range of approximately 0.80 to approximately 0.80 for an energy of 511 keV.

At an energy of 662 keV, the ER Ratio may be no greater than approximately 0.95. In another embodiment, the ER Ratio may be no greater than approximately 0.88, or more particularly, no greater than 0.80 for an energy of 662 keV. In a further embodiment, the ER Ratio may be in a range of approximately 0.74 to approximately 0.95 or more particularly, in a range of approximately 0.76 to approximately 0.85 for an energy of 662 keV. At an energy of 1173 keV, the ER Ratio may be no greater than approximately 0.95. In another embodiment, the ER Ratio may be no greater than approximately 0.90, or more particularly, no greater than 0.80 for an energy of 1173 keV. In a further embodiment, the ER Ratio may be in a range of approximately 0.70 to approximately 0.95 or more particularly, in a range of approximately 0.74 to approximately 0.90 for an energy of 1173 keV.

At an energy of 1274 keV, the ER Ratio may be no greater than approximately 0.95. In another embodiment, the ER Ratio may be no greater than approximately 0.83, or more particularly, no greater than 0.80 for an energy of 1274 keV. In a further embodiment, the ER Ratio may be in a range of approximately 0.60 to approximately 0.95 or more particularly, in a range of approximately 0.64 to approximately 0.85 for an energy of 1274 keV. At an energy of 1332 keV, the ER Ratio may be no greater than approximately 0.95. In another embodiment, the ER Ratio may be no greater than approximately 0.90, or more particularly, no greater than 0.86 for an energy of 1332 keV. In a further embodiment, the ER Ratio may be in a range of approximately 0.60 to approximately 0.95 or more particularly, in a range of approximately 0.67 to approximately 0.90 for an energy of 1332 keV.

For a Group 2 element, the improvement in ER Ratio can occur at all energies. For a Group 1 element, the improvement in ER Ratio, can be more readily seen at higher energies. In particular, for a scintillator crystal doped with a Group 1 element, the ER Ratio may become more significant at energies at 60 keV and higher, as compared to energies lower than 60 keV. Further, the improvement with ER Ratio with Group 1 elements can be lower than the ER Ratio with a Group 2 element at energies of 356 keV and higher. In particular, the ER Ratio with a Group 1 element can be lower than 0.70. The actual ER Ratios may depend on the concentration of the Group 1 element within the crystal. For example, at energies between 44 keV and 60 keV, a scintillation crystal formed from a melt that includes 0.5 wt % NaBr can have ER Ratio less than 1, while a scintillation crystal formed from a melt that includes 2 wt % NaBr can have ER Ratio greater than 1 at the same energies. After reading this specification, skilled artisans will be able to determine dopants and concentrations to provide an ER Ratio that meets the needs or desires for a particular application.

Non-proportionality (nPR) refers to much a scintillation crystal deviates perfect proportionality between gamma ray energy captured and light output. A scintillation crystal having perfect proportionality would always create the same number of photons per unit energy absorbed, regardless of the energy of the gamma ray. Thus, its departure from perfect proportionality is zero. For the purposes of this specification, nPR for each scintillation crystal is normalized at 662 keV. When nPR is 100%, the photoelectrons at a particular energy, referred to as Z keV will be:

$$Ph_{Z\ keV, 100\%\ nPR} = Ph_{662\ keV} * (Z\ keV/662\ keV),$$

wherein $Ph_{Z\ keV,\ 100\%\ nPR}$ is the number of photoelectrons predicted to be sensed by a photosensor at an energy of Z keV when nPR is 100%, and $Ph_{662\ keV}$ is the number of photoelectrons sensed by the photosensor at 662 keV.

Thus, nPR is:

$$nPR = (Ph_{Z\ keV,\ measured} / Ph_{Z\ keV,\ 100\%\ nPR}) * 100\%,$$

wherein $Ph_{Z\ keV,\ measured}$ is the number of photoelectrons sensed by the photosensor at an energy of Z keV.

The value of nPR is the same or improved at energies in a range of 10 keV to 2000 keV when a Group 1 element or a Group 2 element is added as a co-dopant or a dopant in the melt when forming the crystal. The value of nPR for rare earth halides when doped with a Group 2 element is more significant at lower energies than it is for higher energies. If the scintillation crystal generates less scintillating light for lower energy gamma rays, the scintillation crystal has poor proportionality. Thus, the response of the scintillation crystal to gamma rays at lower energies, such no greater than 60 keV, can be more significant to proportionality than the response at higher gamma ray energies, such as greater than 60 keV. At energies lower than 30 keV, the improvement in nPR can be even more significant as compared to 30 keV to 60 keV.

Proportionality can be determined with measuring the scintillation response at many different X-ray or gamma ray energies. A particular useful method uses a tunable monochromatic synchrotron X-ray beam, such as provided by the X1 beam line of Hamburger Synhrotronstrahlungslabor at Deutsches Elektronen-Synchrotron, Hamburg, Germany. Details for an experimental setup can be found in "Nonproportional Response of LaBr:Ce and LaCl:Ce Scintillators to Synchrotron X-ray Irradiation," by I. V. Khodyuk and P. Dorenbos, J. Phys. Condens. Matter, vol. 22, p. 485402, 2010, which is incorporated herein for its detail regarding the experimental setup. X-ray excited luminescence spectra can be recorded using an X-ray tube with a Cu anode operating at 60 kV and 25 mA. The emission of the sample can be focused via a quartz window and a lens on the entrance slit of a monochromator, such as an ARC Model VM-504 monochromator (available from Acton Research Corporation of Acton, Mass., US) (blazed at 300 nm, 1200 grooves/mm), dispersed and recorded with a photomultiplier tube, such as a Hamamatsu Model R943-02 PMT (available from Hamamatsu Photonics Deutschland GmbH of Herrsching am Ammersee, DE). The spectra can be corrected for the monochromator transmission and for the quantum efficiency of the PMT. X-ray excited luminescence measurements may be performed between 80 and 600K using a cryostat. The PMT can be located outside the cryostat and be at room temperature.

The deviation from perfect proportionality ($nPR_{dev}$) is nPR minus 100%. The parameter $nPR_{dev}$ provides an value to quantify how much nPR is away from 100% and an indicator for direction; minus (−) is below 100%, and plus (+) is above 100%. For a set of nPR data points, an averaged value, a largest positive value, a largest negative value, a maximum value, an absolute value of any of the foregoing, a derivative of any of the foregoing, or any combination thereof can be obtained. The averaged value can be an average, a median, or a geometric mean, or may be determined using an integration. In a particular embodiment, the average deviation of nPR from 100% can be determined using an integral in accordance with the equation below.

$$nPR_{dev\ average} = \frac{\int_{E_{lower}}^{E_{upper}} |((nPR(E_i) - 100\%)| \cdot dE_i}{E_{upper} - E_{lower}}$$

where $nPR(Ei)$ is nPR at energy $E_i$;

$E_{upper}$ is the upper limit of the energy range; and $E_{lower}$ is the lower limit of the energy range.

In the equation above, the absolute value of the deviation is used, and thus, any deviation, whether − or +, is accounted for within the equation. In particular, a positive deviation is not offset by a negative deviation. Thus, the measure provides a good indicator of the degree of deviation over a range of energies For a radiation energy range from 11 keV to 30 keV, the rare earth halide scintillator crystal can have an $nPR_{dev\ average}$ of no greater than approximately 8.0%, or more particularly no greater than approximately 5.0%, or even more particularly no greater than approximately 3.0%. For the radiation energy range of 30 keV to 60 keV, the rare earth scintillation crystal can have an $nPR_{dev\ average}$ of no greater than approximately 3.6%, or more particularly no greater than approximately 3.3%, or even more particularly no greater than approximately 2.9%.

For a radiation energy range from 60 keV to 356 keV, the rare earth halide scintillator crystal can have an $nPR_{dev\ average}$ of no greater than approximately 2.4%, or more particularly no greater than approximately 1.7%, or even more particularly no greater than approximately 0.7%. For the radiation energy range of 356 keV to 1332 keV, the rare earth scintillation crystal has an $nPR_{dev\ average}$ of no greater than approximately 0.5%, or more particularly no greater than approximately 0.20%, or even more particularly no greater than approximately 0.07%.

CeBr$_3$ scintillation crystals may have values that depart more strongly from perfect proportionality, as compared to LaBr$_3$:Ce scintillation crystal. For a radiation energy range from 13 keV to 30 keV, the CeBr$_3$ scintillation crystal can have an nPR$_{dev\ average}$ of no greater than approximately 14%, or more particularly no greater than approximately 12%, or even more particularly no greater than approximately 9%. For the radiation energy range of 30 keV to 60 keV, the CeBr$_3$ scintillation crystal can have an nPR$_{dev\ average}$ of no greater than approximately 8.0%, or more particularly no greater than approximately 6.0%, or even more particularly no greater than approximately 4.0%.

For a radiation energy range from 60 keV to 356 keV, the CeBr$_3$ scintillation crystal can have an nPR$_{dev\ average}$ of no greater than approximately 2.0%, or more particularly no greater than approximately 1.3%, or even more particularly no greater than approximately 0.7%. For the radiation energy range of 60 keV to 150 keV, the CeBr$_3$ scintillation crystal can have nPR$_{dev\ average}$ of no greater than approximately 0.20%, or more particularly no greater than approximately 0.15%, or even more particularly no greater than approximately 0.09%.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Item 1. A scintillation crystal comprising Ln$_{(1-y)}$RE$_y$X$_3$:Me, wherein:
Ln represents a rare earth element;
RE represents a different rare earth element;
y has a value in a range of 0 to 1;
X represents a halogen;
Me represents a Group 1 element, a Group 2 element, or any mixture thereof; and
the scintillation crystal is formed from a melt having a Me concentration of at least approximately 0.02 wt. %.

Item 2. A radiation detection apparatus comprising:
a scintillation crystal including Ln$_{(1-y)}$RE$_y$X$_3$:Me, wherein Ln represents a rare earth element; RE represents a different rare earth element; y has a value in a range of 0 to 1; X represents a halogen; Me represents a Group 1 element, a Group 2 element, or any mixture thereof; and the scintillation crystal is formed from a melt having a Me concentration of at least approximately 0.02 wt. %; and
a photosensor optically coupled to the scintillation crystal.

Item 3. A scintillation crystal comprising:
a rare earth halide, wherein:
for a radiation energy range of 11 keV to 30 keV, the scintillation crystal has an nPR$_{dev\ average}$ of no greater than approximately 8.0%; or
for a radiation energy range of 30 keV to 60 keV, the scintillation crystal has the nPR$_{dev\ average}$ of no greater than approximately 3.6%.

Item 4. A scintillation crystal comprising:
a rare earth halide, wherein:
an energy resolution ratio is an energy resolution of the scintillation crystal divided by a different energy resolution of a different scintillation crystal having a different composition, wherein the energy resolution ratio is no greater than approximately 0.95 for an energy of 8 keV; no greater than approximately 0.95 for an energy of 13 keV; no greater than approximately 0.95 for an energy of 17 keV; no greater than approximately 0.95 for an energy of 22 keV; no greater than approximately 0.95 for an energy of 26 keV; no greater than approximately 0.95 for an energy of 32 keV; or no greater than approximately 0.97 for an energy of 44 keV.

Item 5. The scintillation crystal of claim 3 or 4, wherein the scintillation crystal has a general formula of Ln$_{(1-y)}$RE$_y$X$_3$, wherein:
Ln represents a rare earth element;
RE represents a different rare earth element;
y has a value in a range of 0 to 1; and
X represents a halogen.

Item 6. The scintillation crystal or radiation detection apparatus of Item 5, wherein the scintillation crystal further comprises Me, wherein Me represents Li, Na, a Group 2 element, or any mixture thereof; and the scintillation crystal is formed from a melt having a Me concentration of at least approximately 0.02 wt. %.

Item 7. The scintillation crystal or radiation detection apparatus of any one of Items 1, 2, and 6, wherein the melt has the Me concentration of at least approximately 0.08 wt %, at least approximately 0.2 wt. %, or more particularly at least approximately 0.3 wt. %, or even more particularly at least approximately 0.4 wt. %; or no greater than approximately 1.0 wt. %, or more particularly no greater than approximately 0.9 wt. %, or even more particularly no greater than 0.7 wt. %.

Item 8. The scintillation crystal or radiation detection apparatus of any one of Items 1, 2, 6, and 7, wherein the melt has the Me concentration in range of approximately 0.2 wt. % to approximately 0.9 wt. %, or more particularly in a range of approximately 0.3 wt. % to approximately 0.7 wt. %.

Item 9. The scintillation crystal or the radiation detection apparatus of any one of Items 1, 2, and 6 to 8, wherein Me is the Group 2 element.

Item 10. The scintillation crystal or the radiation detection apparatus of Item 9, wherein Me is Ca, Sr, Mg, Ba, or any mixture thereof.

Item 11. The scintillation crystal or the radiation detection apparatus of Item 9, wherein Me is Ca.

Item 12. The scintillation crystal or the radiation detection apparatus of any one of Items 1, 2, and 6 to 8, wherein Me is the Group 1 element.

Item 13. The scintillation crystal or the radiation detection apparatus of Item 11, wherein Me is Li, Na, Rb, Cs, or any mixture thereof.

Item 14. The scintillation crystal or the radiation detection apparatus of Item 11, wherein Me is Li.

Item 15. The scintillation crystal or the radiation detection apparatus of any one of Items 1, 2, and 6 to 8, wherein Me includes at least two different Group 1 elements; at least two different Group 2 elements; or at least one Group 1 element and at least one Group 2 element.

Item 16. The scintillation crystal or radiation detection apparatus of any one of the preceding Items, wherein Ln includes La, Gd, Lu, or any mixture thereof.

Item 17. The scintillation crystal or radiation detection apparatus of any one of the preceding Items, wherein RE includes Ce, Eu, Pr, Tb, Nd, or any mixture thereof.

Item 18. The scintillation crystal or radiation detection apparatus of any one of the preceding Items, wherein y is no greater than approximately 0.5, or more particularly no greater than approximately 0.2, or even more particularly no greater than approximately 0.09; or at least approximately 0.005, or more particularly at least approximately 0.01, or even more particularly at least approximately 0.02.

Item 19. The scintillation crystal or radiation detection apparatus of any one of the preceding Items, wherein y is in a range of approximately 0.01 to approximately 0.09, or more particularly in a range of at least approximately 0.03 to approximately 0.07.

Item 20. The scintillation crystal or radiation detection apparatus of any one of the preceding Items, wherein Ln is La, RE is Ce, and X is Br.

Item 21. The scintillation crystal or radiation detection apparatus of any one of Items 1 to 17 and 20, wherein y is approximately 1.0 f.u.

Item 22. The scintillation crystal or the radiation detection apparatus of Item 21, wherein for a radiation energy range of 13 keV to 30 keV, the scintillation crystal has a $PR_{dev\ average}$ of no greater than approximately 14%, or more particularly no greater than approximately 12%, or even more particularly 9%.

Item 23. The scintillation crystal or the radiation detection apparatus of Item 21 or 22, wherein for a radiation energy range of 30 keV to 60 keV, the scintillation crystal has a $PR_{dev\ average}$ of no greater than approximately 8.0% or more particularly no greater than approximately 6.0%, or even more particularly no greater than 4.0%.

Item 24. The scintillation crystal or the radiation detection apparatus of any one of Items 21 or 23, wherein for a radiation energy range of 60 keV to 356 keV, scintillation crystal has a $PR_{dev\ average}$ of no greater than approximately 2.0% or more particularly no greater than approximately 1.3%, or even more particularly no greater than 0.7%.

Item 25. The scintillation crystal or the radiation detection apparatus of any one of Items 21 to 24, wherein for a radiation energy range of 356 keV to 1372 keV, scintillation crystal has a $PR_{dev\ average}$ of no greater than approximately 0.20% or more particularly no greater than approximately 0.15%, or even more particularly no greater than 0.09%.

Item 26. The scintillation crystal or the radiation detection apparatus of any one of Items 1, 2, and 6 to 20, wherein for a radiation energy range of 11 keV to 30 keV, the scintillation crystal has a $PR_{dev\ average}$ of no greater than approximately 8.0%; or for a radiation energy range of 30 keV to 60 keV, the scintillation crystal has the $PR_{dev\ average}$ of no greater than approximately 3.6%.

Item 27. The scintillation crystal or the radiation detection apparatus of any one of Items 1 to 20, and 26, wherein for a radiation energy range of 11 keV to 32 keV, scintillation crystal has a $PR_{dev\ average}$ of no greater than approximately 8.0% or more particularly no greater than approximately 5.0% or even more particularly no greater than approximately 3.0%.

Item 28. The scintillation crystal or the radiation detection apparatus of any one of Items 1 to 20, 26, and 27, wherein for a radiation energy range of 30 keV to 60 keV, scintillation crystal has a $PR_{dev\ average}$ of no greater than approximately 3.6% or more particularly no greater than approximately 3.3% or even more particularly no greater than approximately 2.9%.

Item 29. The scintillation crystal or the radiation detection apparatus of any one of Items 1 to 20, and 26 to 28, wherein for a radiation energy range of 60 keV to 356 keV, scintillation crystal has a $PR_{dev\ average}$ of no greater than approximately 2.4% or more particularly no greater than approximately 1.7% or even more particularly no greater than approximately 0.7%.

Item 30. The scintillation crystal or the radiation detection apparatus of any one of Items 1 to 20, and 26 to 29, wherein for a radiation energy range of 356 keV to 1332 keV, scintillation crystal has a $PR_{dev\ average}$ of no greater than approximately 0.50% or more particularly no greater than approximately 0.20% or even more particularly no greater than approximately 0.07%.

Item 31. The scintillation crystal or radiation detection apparatus of any one of Items 3 and 22 to 30, wherein the averaged value for deviation of nPR from 100% ($nPR_{dev\ average}$) is determined by:

$$nPR_{dev\ average} = \frac{\int_{E_{lower}}^{E_{upper}} |((nPR(E_i) - 100\%)| \cdot dE_i}{E_{upper} - E_{lower}},$$

where
$nPR(Ei)$ is nPR at energy $E_i$;
$E_{upper}$ is the upper limit of the energy range; and
$E_{lower}$ is the lower limit of the energy range.

Item 32. The scintillation crystal or the radiation detection apparatus of any one of the preceding Items, wherein an energy resolution ratio is an energy resolution of the scintillation crystal divided by a different energy resolution of a different scintillation crystal of a different composition, wherein the energy resolution ratio is no greater than approximately 0.95 for an energy of 8 keV; no greater than approximately 0.95 for an energy of 13 keV; no greater than approximately 0.95 for an energy of 17 keV; no greater than approximately 0.95 for an energy of 22 keV; no greater than approximately 0.95 for an energy of 26 keV; no greater than approximately 0.95 for an energy of 32 keV; no greater than approximately 0.97 for an energy of 44 keV; no greater than approximately 0.95 for an energy of 60 keV; no greater than approximately 0.95 for an energy of 81 keV; no greater than approximately 0.95 for an energy of 276 keV; no greater than approximately 0.95 for an energy of 303 keV; no greater than approximately 0.95 for an energy of 356 keV; no greater than approximately 0.95 for an energy of 384 keV; no greater than approximately 0.95 for an energy of 511 keV; no greater than approximately 0.95 for an energy of 662 keV; no greater than approximately 0.95 for an energy of 1173 keV; no greater than approximately 0.95 for an energy of 1274 keV; no greater than approximately 0.95 for an energy of 1332 keV; or any combination thereof.

Item 33. The scintillation crystal or the radiation detection apparatus of any one of Items 4 and 32, wherein the energy resolution ratio is no greater than approximately 0.95 for the energy of 8 keV, or more particularly no greater than approximately 0.88 for the energy of 8 keV, or still more particularly no greater than approximately 0.80 for the energy of 8 keV.

Item 34. The scintillation crystal or the radiation detection apparatus of any one of Items 4, 32, and 33, wherein the energy resolution ratio is in a range approximately 0.79 to approximately 0.95 or more particularly in a range of approximately 0.79 to approximately 0.86 for the energy of 8 keV.

Item 35. The scintillation crystal or the radiation detection apparatus of any one of Items 4 and 32 to 34, wherein the energy resolution ratio is no greater than approximately 0.95 for the energy of 13 keV, or more particularly no greater than approximately 0.88 for the energy of 13 keV, or still more particularly no greater than approximately 0.80 for the energy of 13 keV.

Item 36. The scintillation crystal or the radiation detection apparatus of any one of Items 4 and 32 to 35, wherein the energy resolution ratio is in a range approximately 0.78 to approximately 0.95 or more particularly in a range of approximately 0.79 to approximately 0.88 for the energy of 13 keV.

Item 37. The scintillation crystal or the radiation detection apparatus of any one of Items 4 and 32 to 36, wherein the energy resolution ratio is no greater than approximately 0.95 for the energy of 17 keV, or more particularly no greater than approximately 0.90 for the energy of 17 keV, or still more particularly no greater than approximately 0.80 for the energy of 17 keV.

Item 38. The scintillation crystal or the radiation detection apparatus of any one of Items 4 and 32 to 37, wherein the energy resolution ratio is in a range approximately 0.76 to approximately 0.95 or more particularly in a range of approximately 0.78 to approximately 0.90 for the energy of 17 keV.

Item 39. The scintillation crystal or the radiation detection apparatus of any one of Items 4 and 32 to 38, wherein the energy resolution ratio is no greater than approximately 0.95 for the energy of 22 keV, or more particularly no greater than approximately 0.90 for the energy of 22 keV, or still more particularly no greater than approximately 0.87 for the energy of 22 keV.

Item 40. The scintillation crystal or the radiation detection apparatus of any one of Items 4 and 32 to 39, wherein the energy resolution ratio is in a range approximately 0.84 to approximately 0.95 or more particularly in a range of approximately 0.85 to approximately 0.90 for the energy of 22 keV.

Item 41. The scintillation crystal or the radiation detection apparatus of any one of Items 4 and 32 to 40, wherein the energy resolution ratio is no greater than approximately 0.95 for the energy of 26 keV, or more particularly no greater than approximately 0.86 for the energy of 26 keV, or still more particularly no greater than approximately 0.80 for the energy of 26 keV.

Item 42. The scintillation crystal or the radiation detection apparatus of any one of Items 4 and 32 to 41, wherein the energy resolution ratio is in a range approximately 0.75 to approximately 0.95 or more particularly in a range of approximately 0.77 to approximately 0.90 for the energy of 26 keV.

Item 43. The scintillation crystal or the radiation detection apparatus of any one of Items 4 and 32 to 42, wherein an energy resolution ratio is no greater than approximately 0.95 for the energy of 32 keV, or more particularly no greater than approximately 0.90 for the energy of 32 keV, or still more particularly no greater than approximately 0.80 for the energy of 32 keV.

Item 44. The scintillation crystal or the radiation detection apparatus of anyone of Items 4 and 32 to 43, wherein the energy resolution ratio is in a range of approximately 0.75 to approximately 0.95 or more particularly in a range of approximately 0.76 to approximately 0.90 for the energy of 32 keV.

Item 45. The scintillation crystal or the radiation detection apparatus of any one of Items 4 and 32 to 44, wherein the energy resolution ratio is no greater than approximately 0.97 for the energy of 44 keV, or more particularly no greater than approximately 0.88 for the energy of 44 keV, or still more particularly no greater than approximately 0.80 for the energy of 44 keV.

Item 46. The scintillation crystal or the radiation detection apparatus of any one of Items 4 and 32 to 45, wherein the energy resolution ratio is in a range approximately 0.70 to approximately 0.97 or more particularly in a range of approximately 0.73 to approximately 0.85 for the energy of 44 keV.

Item 47. The scintillation crystal or the radiation detection apparatus of any one of Items 4 and 32 to 46, wherein the energy resolution ratio is no greater than approximately 0.95 for the energy of 60 keV, or more particularly no greater than approximately 0.90 for the energy of 60 keV, or still more particularly no greater than approximately 0.80 for the energy of 60 keV.

Item 48. The scintillation crystal or the radiation detection apparatus of any one of Items 4 and 32 to 47, wherein the energy resolution ratio is in a range approximately 0.70 to approximately 0.95 or more particularly in a range of approximately 0.76 to approximately 0.91 for the energy of 60 keV.

Item 49. The scintillation crystal or the radiation detection apparatus of any one of Items 4 and 32 to 48, wherein the energy resolution ratio is no greater than approximately 0.95 for the energy of 81 keV, or more particularly no greater than approximately 0.90 for the energy of 81 keV, or still more particularly no greater than approximately 0.81 for the energy of 81 keV.

Item 50. The scintillation crystal or the radiation detection apparatus of any one of Items 4 and 32 to 49, wherein the energy resolution ratio is in a range approximately 0.75 to approximately 0.95 or more particularly in a range of approximately 0.79 to approximately 0.90 for the energy of 81 keV.

Item 51. The scintillation crystal or the radiation detection apparatus of any one of Items 4 and 32 to 50, wherein the energy resolution ratio is no greater than approximately 0.95 for the energy of 276 keV, or more particularly no greater than approximately 0.85 for the energy of 276 keV, or still more particularly no greater than approximately 0.75 for the energy of 276 keV.

Item 52. The scintillation crystal or the radiation detection apparatus of any one of Items 4 and 32 to 51, wherein the energy resolution ratio is in a range approximately 0.70 to approximately 0.95 or more particularly in a range of approximately 0.73 to approximately 0.85 for the energy of 276 keV.

Item 53. The scintillation crystal or the radiation detection apparatus of any one of Items 4 and 32 to 52, wherein the energy resolution ratio is no greater than approximately 0.95 for the energy of 303 keV, or more particularly no greater than approximately 0.88 for the energy of 303 keV, or still more particularly no greater than approximately 0.83 for the energy of 303 keV.

Item 54. The scintillation crystal or the radiation detection apparatus of any one of Items 4 and 32 to 53, wherein the energy resolution ratio is in a range approximately 0.80 to approximately 0.95 or more particularly in a range of approximately 0.81 to approximately 0.90 for the energy of 303 keV.

Item 55. The scintillation crystal or the radiation detection apparatus of any one of Items 4 and 32 to 54, wherein the energy resolution ratio is no greater than approximately 0.95 for the energy of 356 keV, or more particularly no greater than approximately 0.90 for the energy of 356 keV, or still more particularly no greater than approximately 0.85 for the energy of 356 keV.

Item 56. The scintillation crystal or the radiation detection apparatus of any one of Items 4 and 32 to 55, wherein the energy resolution ratio is in a range approximately 0.80 to approximately 0.95 or more particularly in a range of approximately 0.81 to approximately 0.86 for the energy of 356 keV.

Item 57. The scintillation crystal or the radiation detection apparatus of any one of Items 4 and 32 to 56, wherein the energy resolution ratio is no greater than approximately 0.95 for the energy of 384 keV, or more particularly no greater than approximately 0.90 for the energy of 384 keV, or still more particularly no greater than approximately 0.85 for the energy of 384 keV.

Item 58. The scintillation crystal or the radiation detection apparatus of any one of Items 4 and 32 to 57, wherein the energy resolution ratio is in a range approximately 0.80 to approximately 0.95 or more particularly in a range of approximately 0.81 to approximately 0.88 for the energy of 384 keV.

Item 59. The scintillation crystal or the radiation detection apparatus of any one of Items 4 and 32 to 58, wherein the energy resolution ratio is no greater than approximately 0.95 for the energy of 511 keV, or more particularly no greater than approximately 0.88 for the energy of 511 keV, or still more particularly no greater than approximately 0.83 for the energy of 511 keV.

Item 60. The scintillation crystal or the radiation detection apparatus of any one of Items 4 and 32 to 59, wherein the energy resolution ratio is in a range approximately 0.78 to approximately 0.95 or more particularly in a range of approximately 0.80 to approximately 0.88 for the energy of 511 keV.

Item 61. The scintillation crystal or the radiation detection apparatus of any one of Items 4 and 32 to 60, wherein the energy resolution ratio is no greater than approximately 0.95 for the energy of 662 keV, or more particularly no greater than approximately 0.88 for the energy of 662 keV, or still more particularly no greater than approximately 0.80 for the energy of 662 keV.

Item 62. The scintillation crystal or the radiation detection apparatus of any one of Items 4 and 32 to 61, wherein the energy resolution ratio is in a range approximately 0.74 to approximately 0.95 or more particularly in a range of approximately 0.76 to approximately 0.85 for the energy of 662 keV.

Item 63. The scintillation crystal or the radiation detection apparatus of any one of Items 4 and 32 to 62, wherein the energy resolution ratio is no greater than approximately 0.95 for the energy of 1173 keV, or more particularly no greater than approximately 0.90 for the energy of 1173 keV, or still more particularly no greater than approximately 0.80 for the energy of 1173 keV.

Item 64. The scintillation crystal or the radiation detection apparatus of any one of Items 4 and 32 to 63, wherein the energy resolution ratio is in a range approximately 0.70 to approximately 0.90 or more particularly in a range of approximately 0.74 to approximately 0.90 for the energy of 1173 keV.

Item 65. The scintillation crystal or the radiation detection apparatus of any one of Items 4 and 32 to 64, wherein the energy resolution ratio is no greater than approximately 0.95 for the energy of 1274 keV, or more particularly no greater than approximately 0.83 for the energy of 1274 keV, or still more particularly no greater than approximately 0.80 for the energy of 1274 keV.

Item 66. The scintillation crystal or the radiation detection apparatus of any one of Items 4 and 32 to 65, wherein the energy resolution ratio is in a range approximately 0.60 to approximately 0.95 or more particularly in a range of approximately 0.64 to approximately 0.85 for the energy of 1274 keV.

Item 67. The scintillation crystal or the radiation detection apparatus of any one of Items 4 and 32 to 66, wherein the energy resolution ratio is no greater than approximately 0.95 for the energy of 1332 keV, or more particularly no greater than approximately 0.90 for the energy of 1332 keV, or still more particularly no greater than approximately 0.86 for the energy of 1332 keV.

Item 68. The scintillation crystal or the radiation detection apparatus of any one of Items 4 and 32 to 67, wherein the energy resolution ratio is in a range approximately 0.60 to approximately 0.95 or more particularly in a range of approximately 0.67 to approximately 0.90 for the energy of 1332 keV.

Item 69. The radiation detection apparatus of any one of Items 2 and 6 to 68, wherein the radiation detection apparatus is a medical imaging system or a well logging apparatus.

EXAMPLES

The concepts described herein will be further described in the Examples, which do not limit the scope of the invention described in the claims. The Examples demonstrate performance of scintillation crystals of different compositions. Numerical values as disclosed in this Examples section may be averaged from a plurality of readings, approximated, or rounded off for convenience.

Scintillator crystals were formed from an open crucible using different combinations of $LaBr_3$, $CeBr_3$, NaBr, $SrBr_2$, and $BaBr_2$. For the co-dopants and dopants, the values in Table 1 reflect the amounts of the co-dopants and dopants added to the melt.

TABLE 1

Crystal Compositions and Sample Sizes

| Sample # | Description | $CaBr_2$ (wt. %) | $SrBr_2$ (wt. %) | $BaBr_2$ (wt. %) | NaBr (wt. %) | Sample Size (approx., cm3) |
|---|---|---|---|---|---|---|
| 1 | Undoped $La_{0.95}Ce_{0.05}Br_3$ | — | — | — | — | 0.05 |
| 2 | Ca-doped $La_{0.95}Ce_{0.05}Br_3$ | 0.5 | — | — | — | 0.02 |
| 3 | Sr-doped $La_{0.95}Ce_{0.05}Br_3$ | — | 0.5 | — | — | 0.1 |
| 4 | Ba-doped $La_{0.95}Ce_{0.05}Br_3$ | — | — | 0.5 | — | 0.03 |
| 5 | 0.5% Na-doped $La_{0.95}Ce_{0.05}Br_3$ | — | — | — | 0.5 | 0.1 |
| 6 | 2% Na-doped $La_{0.965}Ce_{0.035}Br_3$ | — | — | — | 2 | 0.01 |
| 7 | Undoped $CeBr_3$ | — | — | — | — | 0.05 |
| 8 | Ca-doped $CeBr_3$ | .5 | — | — | — | 0.05 |
| 9 | Sr-doped $CeBr_3$ | — | .5 | — | — | 0.05 |
| 10 | Na-doped $CeBr_3$ | — | — | — | 0.5 | 0.05 |

Additional scintillation crystals were formed based on the $La_{0.95}Ce_{0.05}Br_3$ formula and used 20 wt. % Na and 20 wt. % Na/20 wt. % Sr in the melt. For these crystals and the crystals in Table 1, the crystal having the $La_{0.95}Ce_{0.05}Br_3$ formula with 20 wt. % Na/20 wt. % Sr in the melt had cracks. The other crystals were transparent and did not have cracks. Samples were obtained from the crystals and had approximate sizes as listed in Table 1.

The scintillation crystals were analyzed for energy resolution. Gamma ray excited pulse-height spectra at room temperature were recorded with a Hamamatsu Model R1791 PMT connected to a Cremat Model CR-112 pre-amplifier and an ORTEC Model 672 spectroscopic amplifier with 10 µs shaping time. The voltage of the PMT was set to 400 V to avoid saturation due to intensive signals in short time interval. The bare crystals were mounted on the window of the PMT and covered with several Teflon layers; all pulse-height measurements were performed inside an M-Braun UNILAB dry box with a moisture content less than 1 part per million. The yield expressed in photoelectrons per MeV of absorbed gamma ray energy (phe/MeV) was determined without an optical coupling between the scintillator and the PMT-window. The yield was obtained from the ratio between the peak position of the 662-keV photopeak and the position of the mean value of the so-called single photo-electron peak in pulse-height spectra. Single photoelectron spectra were recorded with a Hamamatsu Model R1791 PMT connected to a Cremat Model CR-110 pre-amplifier. The absolute light yield expressed in photons per MeV (ph/MeV) was determined by correcting for the quantum efficiency and reflectivity of the PMT.

The energy resolution ("ER") is obtained from the data collected using the samples and equipment as previously described. Tables 2 and 3 include the energy resolution data for Samples 1 to 10.

TABLE 2

Energy Resolution Data

| Sample # | Description | 8 keV | 13 keV | 17 keV | 22 keV | 26 keV | 32 keV | 44 keV | 60 keV | 81 keV |
|---|---|---|---|---|---|---|---|---|---|---|
| 1 | Undoped $La_{0.95}Ce_{0.05}Br_3$ | 40.8 | 30.9 | 23.9 | 20.1 | 16.7 | 15.9 | 14.3 | 11.3 | 9.35 |
| 2 | Ca-doped $La_{0.95}Ce_{0.05}Br_3$ | 32.3 | 24.4 | 18.7 | 17.2 | — | 12.1 | 10.5 | 8.52 | 7.38 |
| 3 | Sr-doped $La_{0.95}Ce_{0.05}Br_3$ | 34.9 | 26.5 | 21.3 | 18.0 | 14.9 | 14.4 | 12.2 | 9.08 | 7.62 |
| 4 | Ba-doped $La_{0.95}Ce_{0.05}Br_3$ | 33.4 | 31.6 | 19.7 | 16.9 | — | 15.3 | 13.9 | 10.3 | 8.70 |
| 5 | 0.5% Na-doped $La_{0.95}Ce_{0.05}Br_3$ | 41.7 | 29.6 | 23.8 | 19.8 | 14.9 | 15.1 | 13.9 | 10.1 | 8.38 |
| 6 | 2% Na-doped $La_{0.95}Ce_{0.05}Br_3$ | — | — | — | — | — | 16.7 | — | 11.7 | — |
| 7 | Undoped $CeBr_3$ | 72.7 | 44.6 | 36.1 | 30.5 | — | 24.9 | 23.4 | 18.0 | 14.7 |
| 8 | Ca-doped $CeBr_3$ | 53.4 | 36.0 | 29.7 | 24.8 | — | 19.2 | 17.8 | 13.6 | 11.3 |
| 9 | Sr-doped $CeBr_3$ | 55.5 | 34.1 | 28.6 | 23.7 | — | 18.3 | 16.9 | 12.8 | 10.7 |
| 10 | Na-doped $CeBr_3$ | 64.7 | 40.4 | 34.0 | 28.0 | — | 22.5 | 22.0 | 16.8 | 13.5 |

TABLE 3

Energy Resolution Data

| Sample # | Description | 276 keV | 303 keV | 356 keV | 384 keV | 511 keV | 662 keV | 1173 keV | 1274 keV | 1332 keV |
|---|---|---|---|---|---|---|---|---|---|---|
| 1 | Undoped $La_{0.95}Ce_{0.05}Br_3$ | 5.45 | 4.83 | 4.68 | 4.51 | 3.96 | 3.57 | 2.96 | 3.33 | 2.81 |
| 2 | Ca-doped $La_{0.95}Ce_{0.05}Br_3$ | 4.55 | 4.11 | 3.93 | 3.74 | 3.43 | 2.94 | 2.66 | 2.64 | 2.27 |
| 3 | Sr-doped $La_{0.95}Ce_{0.05}Br_3$ | 4.02 | 3.90 | 3.88 | 3.82 | 3.39 | 2.95 | 2.32 | 2.71 | 2.40 |
| 4 | Ba-doped $La_{0.95}Ce_{0.05}Br_3$ | 5.37 | 4.88 | 4.97 | 4.62 | 4.37 | 3.8 | 3.24 | 4.13 | 2.52 |
| 5 | 0.5% Na-doped $La_{0.95}Ce_{0.05}Br_3$ | 4.57 | 3.99 | 3.83 | 3.69 | 3.20 | 2.73 | 2.20 | 2.12 | 1.97 |
| 6 | 2% Na-doped $La_{0.95}Ce_{0.05}Br_3$ | — | — | — | — | — | — | — | — | — |
| 7 | Undoped $CeBr_3$ | 7.50 | 6.80 | 6.98 | 5.60 | 5.71 | 4.93 | 4.51 | 4.67 | 3.09 |
| 8 | Ca-doped $CeBr_3$ | 5.96 | 5.63 | 5.28 | 4.93 | 4.39 | 3.64 | 3.41 | 3.44 | 3.16 |
| 9 | Sr-doped $CeBr_3$ | 6.00 | 5.05 | 4.81 | 4.40 | 4.03 | 3.45 | 3.00 | 2.73 | 2.60 |
| 10 | Na-doped $CeBr_3$ | 5.99 | 6.03 | 5.83 | 5.76 | 4.78 | 4.11 | 3.41 | 3.16 | 3.01 |

Figure 2:
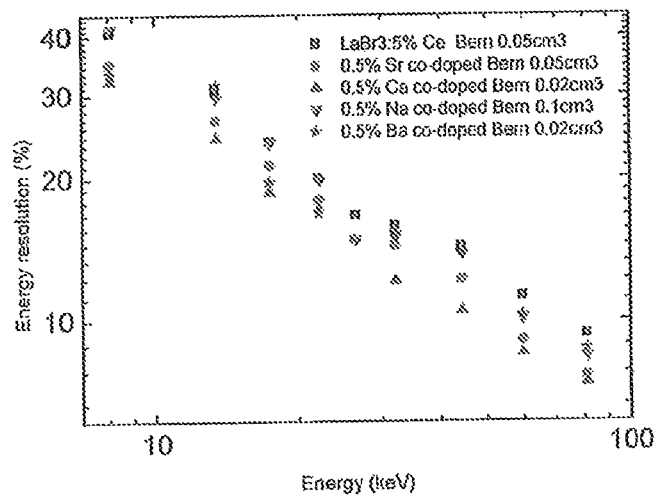
FIG. 2 includes a plot of energy resolution as a function of energy for different compositions of $LaBr_3:Ce$ scintillation crystals at gamma ray energies in a range of approximately 8 keV to approximately 90 keV.
Figure 3:
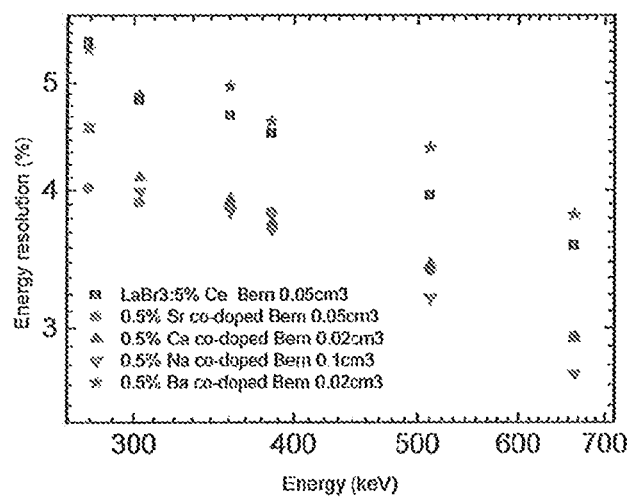
FIG. 3 includes a plot of energy resolution ratio as a function of energy for different compositions of $LaBr_3:Ce$ scintillation crystals at gamma ray energies in a range of approximately 276 keV to approximately 662 keV.
Figure 4:
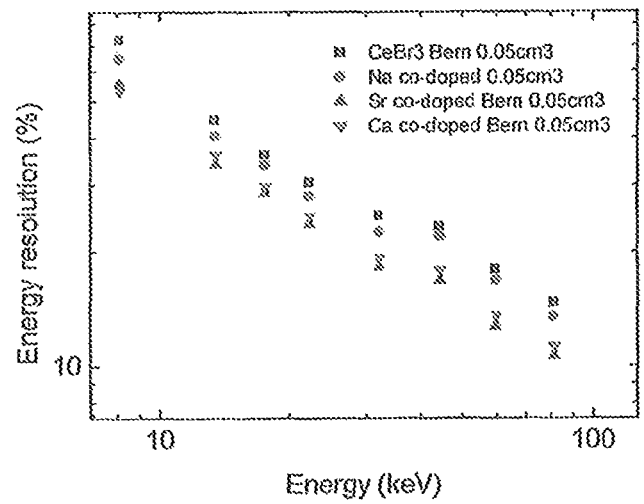
FIG. 4 includes a plot of energy resolution as a function of energy for different compositions of $CeBr_3$ scintillation crystals at gamma ray energies in a range of approximately 8 keV to approximately 90 keV.
Figure 5:
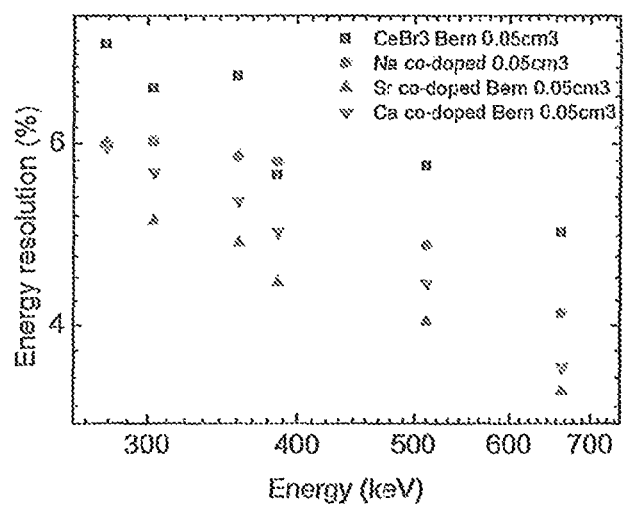
FIG. 5 includes a plot of energy resolution ratio as a function of energy for different compositions of $CeBr_3$ scintillation crystals at gamma ray energies in a range of approximately 276 keV to approximately 662 keV.

FIGS. 2 and 3 include plots for the data for Samples 1 to 5. FIG. 2 includes energy resolution the data for energies in a range of 8 keV to 81 keV, and FIG. 3 includes the energy resolution data for energies in a range of 276 keV to 662 keV. FIGS. 4 and 5 include plots for the data for Samples 7 to 10. FIG. 4 includes energy resolution the data for energies in a range of 8 keV to 81 keV, and FIG. 5 includes the energy resolution data for energies in a range of 276 keV to 662 keV.

The energy resolution ratio ("ER Ratio") is the ratio of the energy resolution of a particular sample divided by the energy resolution of another sample. By using the ER Ratio, the comparison between two different scintillation crystals should have less dependence on the energy, as opposed to using only the energy resolution. Tables 4 and 5 include the ER Ratio data. Samples 2 to 6 are compared to Sample 1, and Samples 8 to 10 are compared to Sample 7. For example, the ER Ratio for Sample 2 (in Tables 4 and 5) is the ER for Sample 2 (in Tables 2 and 3) divided by the ER for Sample 1 (in Tables 2 and 3). "N/A" indicates that the ER Ratio is not applicable for the particular sample.

TABLE 4

ER Ratios

| Sample # | Description | 8 keV | 13 keV | 17 keV | 22 keV | 26 keV | 32 keV | 44 keV | 60 keV | 81 keV |
|---|---|---|---|---|---|---|---|---|---|---|
| 1 | Undoped $La_{0.95}Ce_{0.05}Br_3$ | N/A | N/A | N/A | N/A | N/A | N/A | N/A | N/A | N/A |
| 2 | Ca-doped $La_{0.95}Ce_{0.05}Br_3$ | 0.791 | 0.791 | 0.781 | 0.848 | — | 0.762 | 0.730 | 0.757 | 0.789 |
| 3 | Sr-doped $La_{0.95}Ce_{0.05}Br_3$ | 0.857 | 0.860 | 0.891 | 0.897 | 0.889 | 0.889 | 0.850 | 0.806 | 0.806 |
| 4 | Ba-doped $La_{0.95}Ce_{0.05}Br_3$ | 0.820 | 1.02 | 0.823 | 0.843 | — | 0.962 | 0.971 | 0.910 | 0.930 |
| 5 | 0.5% Na-doped $La_{0.95}Ce_{0.05}Br_3$ | 1.02 | 0.960 | 0.996 | 0.989 | 0.889 | 0.949 | 0.966 | 0.898 | 0.896 |
| 6 | 2% Na-doped $La_{0.95}Ce_{0.05}Br_3$ | — | — | — | — | — | 1.05 | — | 1.04 | — |
| 7 | Undoped $CeBr_3$ | N/A | N/A | N/A | N/A | N/A | N/A | N/A | N/A | N/A |
| 8 | Ca-doped $CeBr_3$ | 0.732 | 0.807 | 0.822 | 0.812 | 0.771 | 0.771 | 0.769 | 0.754 | 0.765 |
| 9 | Sr-doped $CeBr_3$ | 0.762 | 0.763 | 0.791 | 0.778 | 0.733 | 0.733 | 0.722 | 0.708 | 0.725 |
| 10 | Na-doped $CeBr_3$ | 0.892 | 0.906 | 0.941 | 0.920 | 0.904 | 0.905 | 0.942 | 0.935 | 0.917 |

TABLE 5

ER Ratios

| Sample # | Description | 276 keV | 303 keV | 356 keV | 384 keV | 511 keV | 662 keV | 1173 keV | 1274 keV | 1332 keV |
|---|---|---|---|---|---|---|---|---|---|---|
| 1 | Undoped $La_{0.95}Ce_{0.05}Br_3$ | N/A | N/A | N/A | N/A | N/A | N/A | N/A | N/A | N/A |
| 2 | Ca-doped $La_{0.95}Ce_{0.05}Br_3$ | 0.834 | 0.851 | 0.840 | 0.829 | 0.866 | 0.824 | 0.899 | 0.793 | 0.808 |
| 3 | Sr-doped $La_{0.95}Ce_{0.05}Br_3$ | 0.738 | 0.807 | 0.829 | 0.847 | 0.856 | 0.826 | 0.784 | 0.814 | 0.854 |
| 4 | Ba-doped $La_{0.95}Ce_{0.05}Br_3$ | 0.985 | 1.01 | 1.06 | 1.02 | 1.10 | 1.06 | 1.09 | 1.24 | 0.897 |
| 5 | 0.5% Na-doped $La_{0.95}Ce_{0.05}Br_3$ | 0.839 | 0.826 | 0.818 | 0.818 | 0.808 | 0.765 | 0.743 | 0.647 | 0.676 |
| 6 | 2% Na-doped $La_{0.95}Ce_{0.05}Br_3$ | — | — | — | — | — | — | — | — | — |
| 7 | Undoped $CeBr_3$ | N/A | N/A | N/A | N/A | N/A | N/A | N/A | N/A | N/A |
| 8 | Ca-doped $CeBr_3$ | 0.795 | 0.828 | 0.756 | 0.880 | 0.769 | 0.738 | 0.756 | 0.737 | 1.02 |
| 9 | Sr-doped $CeBr_3$ | 0.800 | 0.743 | 0.689 | 0.786 | 0.706 | 0.700 | 0.665 | 0.858 | 0.840 |
| 10 | Na-doped $CeBr_3$ | 0.799 | 0.887 | 0.835 | 1.03 | 0.837 | 0.829 | 0.756 | 0.677 | 0.974 |

The data show some variation in ER Ratios for each of the dopants. The variation for Samples 2 and 3 (Ca-doped and Sr-doped) have ER Ratios with relatively low standard deviation. Sample 2 has an average ER Ratio of 0.81 and a standard deviation of 0.04, and Sample 3 has an average ER Ratio of 0.84 and a standard deviation of 0.04. Sample 4 (Ba-doped) has a significantly higher ER Ratio average of 0.99 and a standard deviation of 0.11. Sample 5 (Na-doped) has an intermediate ER Ratio of 0.86 and a standard deviation 0.11. The data suggest that, starting at 60 keV, the ER Ratio for Sample 5 decreases with increasing energy. At 511 keV, Sample 5 has an ER Ratio less than 0.8, and at 1274 keV, Sample 5 has an ER Ratio less than 0.7. Unlike Sample 5, Samples 2 to 4 do not appear to have any discernible trends regarding ER Ratio as energy increases or decreases.

Data for proportionality was also gathered. Proportionality was studied with a set of set of radioactive sources $^{60}$Co, $^{22}$Na, $^{137}$Cs, $^{133}$Ba, $^{241}$Am, plus Amersham variable energy X-ray source, and at the X-1 beamline at the Hamburger Synchrotronstrahlungslabor (HASYLAB) synchrotron radiation facility in Hamburg, Germany using the experimental setup previously references. X-ray excited luminescence spectra were recorded using an X-ray tube with Cu anode operating at 60 kV and 25 mA. The emission of the sample was focused via a quartz window and a lens on the entrance slit of an ARC Model VM-504 monochromator (blazed at 300 nm, 1200 grooves/mm), dispersed and recorded with a Hamamatsu Model R943-02 PMT. The spectra were corrected for the monochromator transmission and for the quantum efficiency of the PMT. X-ray excited luminescence measurements were performed between 80 K and 600 K using a Janis Model VPF-800 Cryostat operated with a LakeShore Model 331 Temperature Controller. The PMT was outside the cryostat and remained at room temperature.

As previously discussed, the departure from perfect proportionality is more significant at lower gamma ray energies because higher energy gamma rays can collide with the scintillator crystal and result in lower energy gamma rays. Tables 6 and 7 include nPR data collected for the scintillation crystals when exposed to gamma ray energies in a range of approximately 8 keV to approximately 1332 keV. Table 8 includes nPR data collected for the LaBr$_3$:Ce scintillation crystals when exposed to gamma ray energies in a range of approximately 11 keV to approximately 100 keV. Table 9 includes nPR data collected for the CeBr$_3$ scintillation crystals when exposed to gamma ray energies in a range of approximately 13 keV to approximately 100 keV. Data collected at 662 keV was used for determining the nPR data in Table 6 to 9.

TABLE 6 nPR Data

| Sample # | Description | 8 keV | 13 keV | 17 keV | 22 keV | 26 keV | 32 keV | 44 keV | 60 keV | 81 keV |
|---|---|---|---|---|---|---|---|---|---|---|
| 1 | Undoped La$_{0.95}$Ce$_{0.05}$Br$_3$ | 90.4 | 96.8 | 94.1 | 95.7 | 96.9 | 98.4 | 97.7 | 98.6 | 99.6 |
| 2 | Ca-doped La$_{0.95}$Ce$_{0.05}$Br$_3$ | 100 | 105 | 103 | 103 | — | 104 | 103 | 104 | 102 |
| 3 | Sr-doped La$_{0.95}$Ce$_{0.05}$Br$_3$ | 98.0 | 102 | 100 | 101 | 100 | 102 | 101 | 102 | 102 |
| 4 | Ba-doped La$_{0.95}$Ce$_{0.05}$Br$_3$ | 96.5 | — | 99.3 | 101 | 101 | 101 | 101 | 102 | 101 |
| 5 | 0.5% Na-doped La$_{0.95}$Ce$_{0.05}$Br$_3$ | 88.8 | 96.4 | 94.2 | 96.1 | 97.0 | 98.3 | 97.0 | 99.4 | 99.8 |
| 7 | Undoped CeBr$_3$ | 71.1 | 81.7 | 82.2 | 85.7 | — | 90.4 | 90.0 | 91.6 | 95.0 |
| 8 | Ca-doped CeBr$_3$ | 84.5 | 93.2 | 92.1 | 94.9 | — | 96.8 | 96.0 | 98.4 | 98.8 |
| 9 | Sr-doped CeBr$_3$ | 84.7 | 93.5 | 92.9 | 95.4 | — | 97.5 | 96.1 | 97.7 | 99.2 |
| 10 | Na-doped CeBr$_3$ | 74.0 | 83.3 | 83.8 | 87.3 | — | 91.8 | 91.4 | 92.8 | 96.4 |

TABLE 7 nPR Data

| Sample # | Description | 276 keV | 303 keV | 356 keV | 384 keV | 511 keV | 662 keV | 1173 keV | 1274 keV | 1332 keV |
|---|---|---|---|---|---|---|---|---|---|---|
| 1 | Undoped La$_{0.95}$Ce$_{0.05}$Br$_3$ | 100 | 100 | 100 | 100 | 101 | 100 | 100 | 100 | 100 |
| 2 | Ca-doped La$_{0.95}$Ce$_{0.05}$Br$_3$ | 101 | 101 | 101 | 101 | 101 | 100 | 100 | 100 | 100 |
| 3 | Sr-doped La$_{0.95}$Ce$_{0.05}$Br$_3$ | 101 | 101 | 100 | 100 | 101 | 100 | 100 | 100 | 100 |
| 4 | Ba-doped La$_{0.95}$Ce$_{0.05}$Br$_3$ | 101 | 101 | 100 | 101 | 101 | 100 | 100 | 100 | 100 |
| 5 | 0.5% Na-doped La$_{0.95}$Ce$_{0.05}$Br$_3$ | 100 | 101 | 101 | 101 | 101 | 100 | 100 | 100 | 100 |
| 7 | Undoped CeBr$_3$ | 99.3 | 100 | 100 | 100 | 100 | 100 | 100 | 100 | 101 |
| 8 | Ca-doped CeBr$_3$ | 100 | 100 | 100 | 100 | 100 | 100 | 100 | 100 | 100 |

TABLE 7-continued nPR Data

| Sample # | Description | 276 keV | 303 keV | 356 keV | 384 keV | 511 keV | 662 keV | 1173 keV | 1274 keV | 1332 keV |
|---|---|---|---|---|---|---|---|---|---|---|
| 9 | Sr-doped CeBr$_3$ | 100 | 100 | 100 | 100 | 100 | 100 | 100 | 100 | 100 |
| 10 | Na-doped CeBr$_3$ | 100 | 101 | 101 | 100 | 101 | 100 | 100 | 100 | 100 |

TABLE 8 nPRs Data

| Energy (keV) | Undoped La$_{0.95}$Ce$_{0.05}$Br$_3$ | Sr-doped La$_{0.95}$Ce$_{0.05}$Br$_3$ | Ca-doped La$_{0.95}$Ce$_{0.05}$Br$_3$ |
|---|---|---|---|
| 11 | 86.7 | 100 | 97.3 |
| 12 | 87.9 | 101 | 99.7 |
| 15 | 88.2 | 100 | 100 |
| 20 | 90.9 | 102 | 103 |
| 25 | 93.4 | 103 | 105 |
| 30 | 95.1 | 103 | 105 |
| 35 | 96.3 | 103 | 104 |
| 38 | 96.7 | 103 | 104 |
| 48 | 95.8 | 102 | 103 |
| 50 | 96.2 | 102 | 103 |
| 55 | 96.8 | 102 | 103 |
| 60 | 97.2 | 102 | 103 |
| 65 | 97.4 | 102 | 103 |
| 70 | 97.9 | 102 | 103 |
| 75 | 98.0 | 102 | 103 |
| 80 | 98.3 | 102 | 103 |
| 85 | 98.5 | 102 | 102 |
| 90 | 98.5 | 102 | 102 |
| 95 | 98.6 | 102 | 102 |
| 100 | 98.8 | 102 | 102 |

TABLE 9 nPRs

| Energy (keV) | Undoped CeBr$_3$ | Sr-doped CeBr$_3$ |
|---|---|---|
| 13 | 80.6 | 90.1 |
| 15 | 78.7 | 88.1 |
| 20 | 84.3 | 92.0 |
| 25 | 88.0 | 94.4 |
| 30 | 90.6 | 95.9 |
| 35 | 92.4 | 96.6 |
| 40 | 93.5 | 97.3 |
| 45 | 91.0 | 95.6 |
| 50 | 92.1 | 96.3 |
| 55 | 93.0 | 96.9 |
| 60 | 93.6 | 97.3 |
| 65 | 95.4 | 97.4 |
| 70 | 94.9 | 97.6 |
| 75 | 95.3 | 97.6 |
| 80 | 95.9 | 97.8 |
| 85 | 96.2 | 97.9 |
| 90 | 96.4 | 97.9 |
| 95 | 96.6 | 98.0 |
| 100 | 96.9 | 98.1 |

Figure 6:
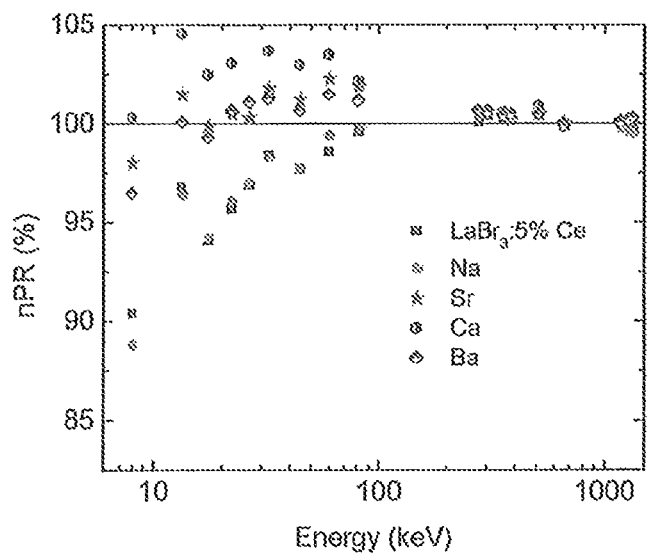
FIG. 6 includes a plot of non-proportionality for different compositions of $LaBr_3:Ce$ scintillation crystals at gamma ray energies in a range of approximately 8 keV to approximately 1332 keV.
Figure 7:
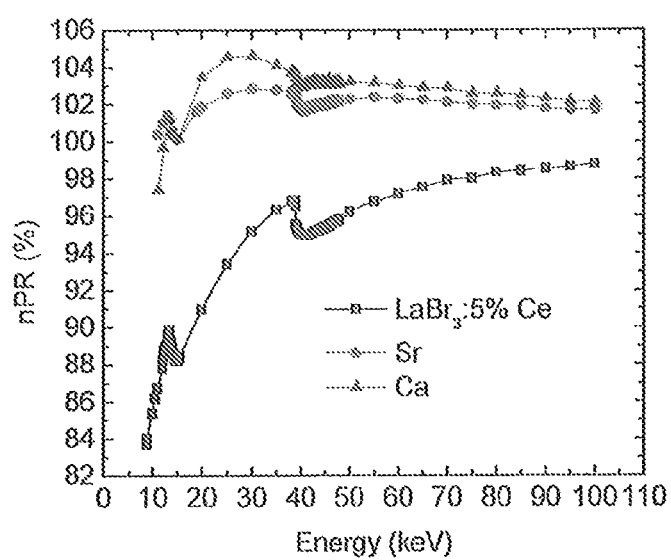
FIG. 7 includes a plot of non-proportionality for different compositions of $LaBr_3:Ce$ scintillation crystals at gamma ray energies in a range of approximately 9 keV to approximately 100 keV.

FIGS. 6 and 7 include plots that include the data for Samples 1 to 5, which are the La$_{0.95}$Ce$_{0.5}$Br$_3$ samples. FIG. 6 includes energy resolution the data for energies in a range of 8 keV to 1332 keV. The plot shows that the Samples 2 to 4 (Ca-doped, Sr-doped, and Ba-doped) have nPRs values that are much closer to 100% for lower energies, as compared to Sample 1 (undoped). Sample 5 (Na-doped) does not appear to have any significant improvement for nPR as compared to Sample 1. FIG. 7 includes the nPR data for Samples 1 to 3 for energies in a range of 9 keV to 100 keV. The difference between Sample 1 and each of Samples 2 and 3 is apparent in FIG. 7. The difference between Sample 1 and each of Samples 2 and 3 is more evident at energies of 32 keV and lower. From the data, Sample 3 appears to have proportionality that is the closest to perfect proportionality over the energy ranges tested, as compared to the other Samples. Sample 2 has slightly less uniform proportionality than Sample 3 and has significantly better proportionality as compared to Samples 1 and 5.

Figure 8:
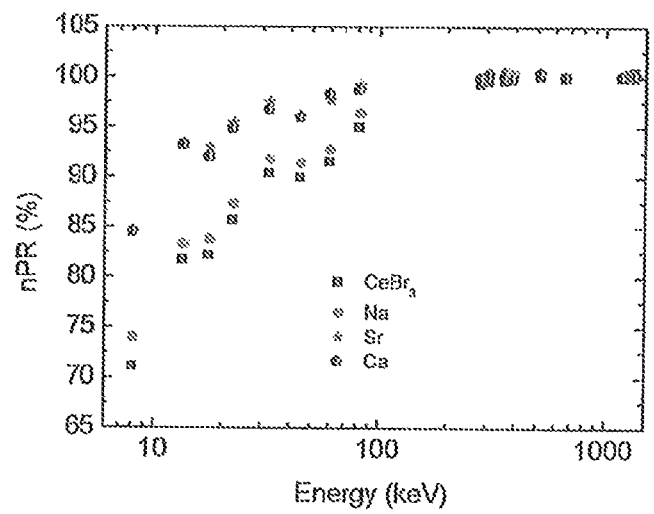
FIG. 8 includes a plot of non-proportionality for different compositions of $CeBr_3$ scintillation crystals at gamma ray energies in a range of approximately 8 keV to approximately 1332 keV.
Figure 9:
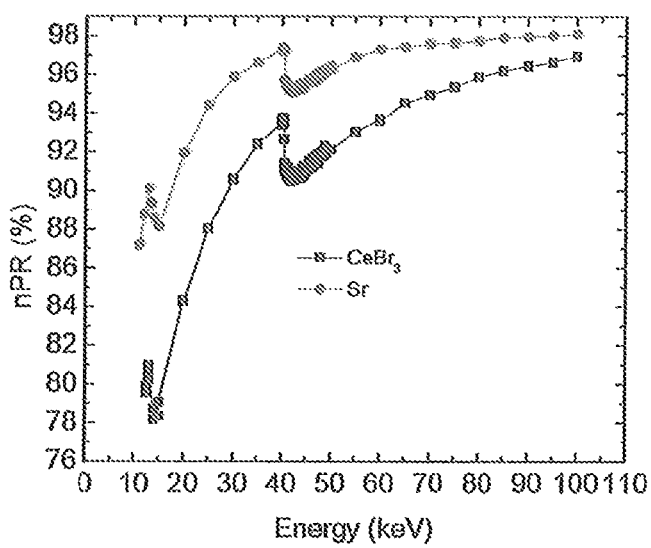
FIG. 9 includes a plot of non-proportionality for different compositions of $CeBr_3$ scintillation crystals at gamma ray energies in a range of approximately 11 keV to approximately 100 keV.

FIGS. 8 and 9 include plots that include the data for Samples 7 to 10, which are the CeBr$_3$ samples. FIG. 8 includes energy resolution the data for energies in a range of 8 keV to 1332 keV. The plot shows that the Samples 8 and 9 (Ca-doped and Sr-doped) have nPRs values that are much closer to 100% for lower energies, as compared to Sample 7 (undoped). Samples 8 and 9 have proportionalities that are close to each other over the range of energies tested. Sample 10 (Na-doped) does not appear to have any significant improvement for nPR as compared to Sample 7. FIG. 9 includes the nPR data for Samples 7 and 9 for energies in a range of 10 keV to 100 keV. The difference between Sample 7 and Sample 9 is apparent in FIG. 9. The difference between Sample 7 and Sample 9 is more evident at energies of 32 keV and lower.

The amount of deviation from 100% and the direction of the deviation can be obtained by subtracting 100% from the nPR values, which is nPR$_{dev}$ that is also in units of %. The equation is provided below.

$$nPR_{dev} = nPR - 100\%.$$

Tables 10 to 13 include the nPR$_{dev}$ data that is derived from the nPR data in Tables 6 to 9.

TABLE 10 nPR$_{dev}$ Data

| Sample # | Description | 8 keV | 13 keV | 17 keV | 22 keV | 26 keV | 32 keV | 44 keV | 60 keV | 81 keV |
|---|---|---|---|---|---|---|---|---|---|---|
| 1 | Undoped La$_{0.95}$Ce$_{0.05}$Br$_3$ | −9.6 | −3.2 | −5.9 | −4.3 | −3.1 | −1.6 | −2.3 | −1.4 | −0.4 |

TABLE 10-continued nPR$_{dev}$ Data

| Sample # | Description | 8 keV | 13 keV | 17 keV | 22 keV | 26 keV | 32 keV | 44 keV | 60 keV | 81 keV |
|---|---|---|---|---|---|---|---|---|---|---|
| 2 | Ca-doped La$_{0.95}$Ce$_{0.05}$Br$_3$ | 0.3 | 4.6 | 2.5 | 3.1 | — | 3.7 | 3.0 | 3.5 | 2.2 |
| 3 | Sr-doped La$_{0.95}$Ce$_{0.05}$Br$_3$ | −2.0 | 1.5 | −0.1 | 0.5 | 0.3 | 1.8 | 1.2 | 2.3 | 1.9 |
| 4 | Ba-doped La$_{0.95}$Ce$_{0.05}$Br$_3$ | −3.5 | — | −0.3 | 0.7 | 1.1 | 1.3 | 0.7 | 1.5 | 1.2 |
| 5 | 0.5% Na-doped La$_{0.95}$Ce$_{0.05}$Br$_3$ | −11.2 | −3.6 | −5.8 | −3.9 | −3.0 | −1.7 | −2.3 | −0.6 | −0.2 |
| 7 | Undoped CeBr$_3$ | −28.9 | −18.3 | −17.8 | −14.3 | — | −9.6 | −10.0 | −8.4 | −5.0 |
| 8 | Ca-doped CeBr$_3$ | −26.0 | −6.8 | −7.9 | −5.2 | — | −3.2 | −4.0 | −1.6 | −1.3 |
| 9 | Sr-doped CeBr$_3$ | −15.3 | −6.5 | −7.1 | −4.6 | — | −2.5 | −3.9 | −2.3 | −0.8 |
| 10 | Na-doped CeBr$_3$ | −15.5 | −16.7 | −16.2 | −12.7 | — | −8.2 | −8.6 | −7.2 | −3.6 |

TABLE 11 nPR$_{dev}$ Data

| Sample # | Description | 276 keV | 303 keV | 356 keV | 384 keV | 511 keV | 662 keV | 1173 keV | 1274 keV | 1332 keV |
|---|---|---|---|---|---|---|---|---|---|---|
| 1 | Undoped La$_{0.95}$Ce$_{0.05}$Br$_3$ | 0.1 | 0.4 | 0.3 | 0.3 | 0.8 | 0.0 | 0.0 | 0.0 | 0.1 |
| 2 | Ca-doped La$_{0.95}$Ce$_{0.05}$Br$_3$ | 0.7 | 0.7 | 0.6 | 0.5 | 0.9 | 0.0 | 0.1 | 0.2 | 0.1 |
| 3 | Sr-doped La$_{0.95}$Ce$_{0.05}$Br$_3$ | 0.6 | 0.6 | 0.4 | 0.2 | 0.5 | 0.0 | 0.1 | −0.1 | 0.0 |
| 4 | Ba-doped La$_{0.95}$Ce$_{0.05}$Br$_3$ | 0.7 | 0.6 | 0.4 | 0.5 | 0.5 | 0.0 | 0.1 | 0.2 | 0.3 |
| 5 | 0.5% Na-doped La$_{0.95}$Ce$_{0.05}$Br$_3$ | 0.3 | 0.5 | 0.5 | 0.2 | 0.6 | 0.0 | −0.2 | −0.4 | −0.5 |
| 7 | Undoped CeBr$_3$ | −0.7 | −0.4 | −0.3 | 0.1 | 0.1 | 0.0 | 0.0 | 0.4 | 0.6 |
| 8 | Ca-doped CeBr$_3$ | −0.2 | 0.2 | 0.1 | 0.2 | 0.5 | 0.0 | 0.1 | 0.2 | 0.3 |
| 9 | Sr-doped CeBr$_3$ | −0.1 | 0.1 | 0.1 | 0.0 | 0.4 | 0.0 | 0.0 | 0.0 | 0.0 |
| 10 | Na-doped CeBr$_3$ | 0.0 | 0.5 | 0.6 | 0.4 | 0.5 | 0.0 | 0.2 | 0.3 | 0.2 |

TABLE 12 nPR$_{dev}$ Data

| Energy (keV) | Undoped La$_{0.95}$Ce$_{0.05}$Br$_3$ | Sr-doped La$_{0.95}$Ce$_{0.05}$Br$_3$ | Ca-doped La$_{0.95}$Ce$_{0.05}$Br$_3$ |
|---|---|---|---|
| 11 | −13.3 | 0.38 | −2.62 |
| 12 | −12.1 | 0.02 | 0.32 |
| 15 | −11.8 | 0.12 | 0.16 |
| 20 | −9.03 | 1.62 | 3.45 |
| 25 | −6.60 | 1.88 | 4.55 |
| 30 | −4.85 | 2.58 | 4.63 |
| 35 | −3.68 | 2.79 | 4.11 |
| 38 | −3.27 | 2.62 | 3.74 |
| 48 | −4.20 | 2.24 | 3.19 |
| 50 | −3.80 | 2.26 | 3.22 |
| 55 | −3.24 | 2.36 | 3.16 |
| 60 | −2.82 | 2.30 | 3.00 |
| 65 | −2.55 | 2.23 | 2.89 |
| 70 | −2.08 | 2.12 | 2.87 |
| 75 | −2.00 | 1.99 | 2.58 |
| 80 | −1.67 | 1.96 | 2.59 |
| 85 | −1.52 | 1.94 | 2.49 |
| 90 | −1.45 | 1.78 | 2.30 |
| 95 | −1.35 | 1.69 | 2.18 |
| 100 | −1.21 | 1.70 | 2.10 |

TABLE 13 nPR$_{dev}$ Data

| Energy (keV) | Undoped CeBr$_3$ | Sr-doped CeBr$_3$ |
|---|---|---|
| 13 | −19.4 | −9.88 |
| 15 | −21.3 | −11.9 |
| 20 | −15.7 | −9.02 |
| 25 | −12.0 | −5.59 |
| 30 | −9.42 | −4.12 |
| 35 | −7.60 | −3.38 |
| 40 | −6.46 | −2.66 |
| 45 | −9.00 | −4.41 |
| 50 | −7.85 | −3.72 |
| 55 | −6.95 | −3.09 |
| 60 | −6.37 | −2.70 |
| 65 | −5.47 | −2.58 |
| 70 | −5.06 | −2.42 |
| 75 | −4.65 | −2.37 |
| 80 | −4.13 | −2.25 |
| 85 | −3.80 | −2.10 |
| 90 | −3.54 | −2.05 |
| 95 | −3.36 | −2.00 |
| 100 | −3.06 | −1.89 |

FIGS. 8 and 9 include plots for the data for Samples 7 to 10, which are the CeBr$_3$ samples. FIG. 8 includes energy resolution the data for energies in a range of 8 keV to 1332 keV. The plot shows that the Samples 8 and 9 (Ca-doped and Sr-doped) have nPRs values that are much closer to 100% for lower energies, as compared to Sample 7 (undoped). Samples 8 and 9 have proportionalities that are close to each other over the range of energies tested. Sample 10 (Na-doped) does not appear to have any significant improvement for nPR, as compared to Sample 7. FIG. 9 includes the nPR data for Samples 7 and 9 for energies in a range of 10 keV to 100 keV. The difference between Sample 7 and Sample 9 is apparent in FIG. 9. The difference between Sample 7 and Sample 9 is more evident at energies of 32 keV and lower.

Data for nPR$_{dev}$ can be used to determine an nPR$_{dev\ average}$ for a particular range of energies. Table 14 includes nPR$_{dev\ average}$ values determined as previously described.

TABLE 14 nPR$_{dev\ average}$ Data

| Sample # | Description | 11 or 13 keV to 30 keV | 30 keV to 60 keV | 60 keV to 356 keV | 356 keV to 1332 keV |
|---|---|---|---|---|---|
| 1 | Undoped La$_{0.95}$Ce$_{0.05}$Br$_3$ | 8.9 | 3.7 | 0.26 | 0.15 |
| 2 | Ca-doped La$_{0.95}$Ce$_{0.05}$Br$_3$ | 2.6 | 3.6 | 1.3 | 0.23 |
| 3 | Sr-doped La$_{0.95}$Ce$_{0.05}$Br$_3$ | 1.3 | 2.5 | 1.2 | 0.13 |
| 4 | Ba-doped La$_{0.95}$Ce$_{0.05}$Br$_3$ | — | — | 0.90 | 0.17 |
| 5 | 0.5% Na-doped La$_{0.95}$Ce$_{0.05}$Br$_3$ | — | — | 0.63 | 0.22 |
| 7 | Undoped CeBr$_3$ | 15.8 | 7.7 | 2.5 | 0.08 |
| 8 | Ca-doped CeBr$_3$ | — | — | 0.63 | 015 |
| 9 | Sr-doped CeBr$_3$ | 8.0 | 3.4 | 0.43 | 0.06 |
| 10 | Na-doped CeBr$_3$ | — | — | 1.7 | 0.20 |

Data for nPR$_{dev\ average}$ is good for distinguishing which samples are more proportional over one or more ranges of energies. For the La$_{0.95}$Ce$_{0.05}$Br$_3$ samples, Sample 3 (Sr-doped) has the best performance over all the energies, particularly at energies from 11 keV to 60 keV. Sample 2 has good proportionality at 11 to 30 keV. At energies in a range of 30 to 60 keV, Sample 2 has nearly the same magnitude of deviation from proportionality as compared to Sample 1. The deviation for Samples 1 and 2 are in opposite directions (− for Sample 1 and + for Sample 2). For energies in a range of 60 keV to 356 keV, Samples 2 to 4 have positive deviation from 100%, and Sample 1 has deviation from 100% that is closer to zero. For energies in a range of 356 keV to 1332 keV, the Samples 1 to 5 have nPR$_{dev\ average}$ values that are less than 0.1% different from one another.

For the CeBr$_3$ samples, Sample 9 (Sr-doped) has the best performance over all the energies, particularly at energies from 11 keV to 60 keV. Although Sample 8 (Ca-doped) does not have as much data, the relationship between Samples 8 and 9 for nPR$_{dev\ average}$ is expected to be about the same as the relationship between Samples 2 and 3 for nPR$_{dev\ average}$. For energies in a range of 60 keV to 356 keV, Samples 8 and 9 have better proportionality compared to Sample 7 (undoped). For energies in a range of 356 keV to 1332 keV, the Samples 7 to 9 have nPR$_{dev\ average}$ values that are less than 0.1% different from one another.

Data have been taken on the relative response of standard and co-doped lanthanum bromide versus temperature. The samples include LaBr$_3$(Ce), LaBr$_3$(Ce,Sr) and LaBr$_3$(Ce,Ba). The cerium concentration in each sample was 4.5 to 5%, meaning that 4.5 to 5% of the La atoms were replaced by Ce. The Sr concentration was 180 parts per million by weight, and the Ba concentration was 160 parts per million by weight. Each crystal was formed as a right circular cylinder with dimensions where the diameter was approximately 2.5 cm and length was approximately 2.5 cm. The light output was measured by locating the centroid of the 662 keV photopeak from a 10 micro-Ci $^{137}$Cs gamma ray source. The source was placed at a distance of 10 mm from one end of the crystal. The other end was coupled to a photomultiplier tube (model: Photonis 20Y0) that was kept at a constant 30° C.

Figure 10:
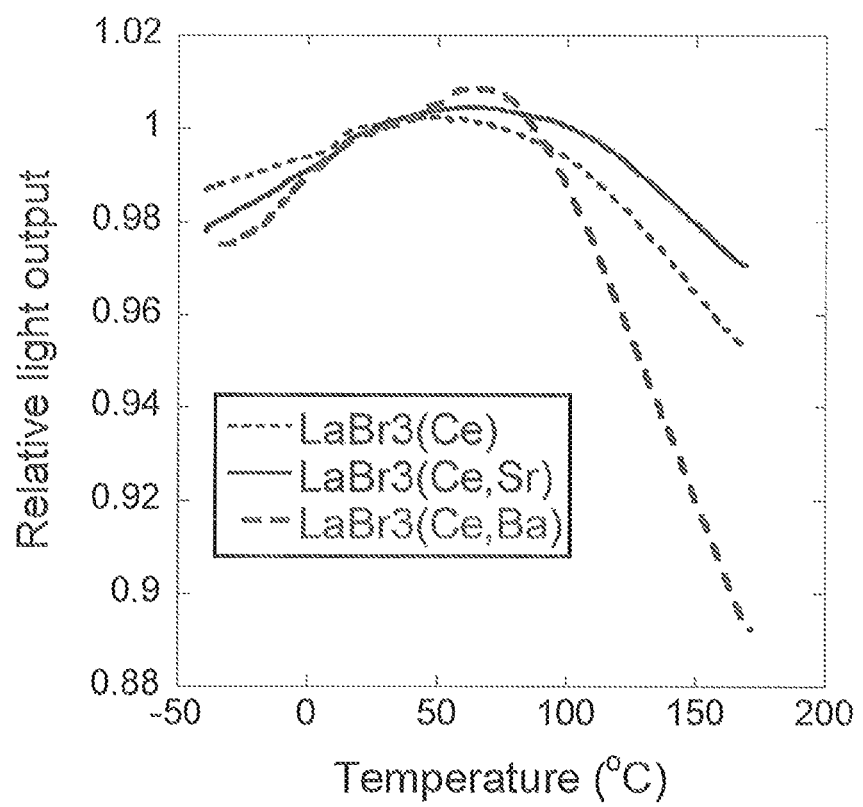
FIG. 10 includes a plot of relative light output for different compositions of $LaBr_3$ scintillation crystals over a range of temperatures.

FIG. 10 includes a plot showing the temperature response of standard, LaBr$_3$(Ce), LaBr$_3$(Ce,Sr) and LaBr$_3$(Ce,Ba). Specifically, the graph shows how the scintillation light output changes with temperature from −40° C. to 175° C. Each curve is normalized to 1.0 at 25° C. When co-doped with Sr, the light output is more constant than standard over the range of −40° C. to 175° C., and is measurably brighter than standard at the highest temperatures. This makes Sr co-doped lanthanum bromide desirable for applications that involve extreme temperature excursions, such as oil well logging and space applications. When co-doped with Ba, the light output increases over the range of room temperature (approximately 22° C.) to about 70° C. This makes Ba co-doped lanthanum bromide desirable for outdoor applications, for example for port-of-entry detectors that can be used for vehicles and cargo.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detection apparatus comprising:
    a scintillation crystal including $Ln_{(1-y)}RE_yX_3$:Ca, wherein:
        Ln represents a rare earth element;
        RE represents a different rare earth element;
        y has a value in a range of 0 to 1;
        X represents a halogen; and
        the scintillation crystal is formed from a melt having a Ca concentration of at least approximately 0.02 wt. %; and
    wherein for a radiation energy range of 11 keV to 30 keV, the scintillation crystal has an $nPR_{dev\ average}$ of no greater than approximately 8.0%; or
    for a radiation energy range of 30 keV to 60 keV, the scintillation crystal has the $nPR_{dev\ average}$ of no greater than approximately 3.6%; and
    an optical interface optically coupled to the scintillation crystal.

2. The radiation detection apparatus of claim 1, wherein the melt has the Ca concentration of at least approximately 0.08 wt. %.

3. The radiation detection apparatus of claim 1, wherein y is no greater than approximately 0.5 and at least approximately 0.005.

4. The radiation detection apparatus of claim 1, wherein y is in a range of approximately 0.01 to approximately 0.09.

5. The radiation detection apparatus of claim 1, wherein Ln is La, RE is Ce, and X is Br.

6. The radiation detection apparatus of claim 1, wherein y is approximately 1.0 f.u.

7. The radiation detection apparatus of claim 1, wherein an energy resolution ratio is an energy resolution of the scintillation crystal divided by a different energy resolution of a different scintillation crystal of a different composition, wherein the energy resolution ratio is:
    no greater than approximately 0.95 for an energy of 8 keV;
    no greater than approximately 0.95 for an energy of 13 keV;
    no greater than approximately 0.95 for an energy of 17 keV;
    no greater than approximately 0.95 for an energy of 22 keV;
    no greater than approximately 0.95 for an energy of 26 keV;
    no greater than approximately 0.95 for an energy of 32 keV; or
    no greater than approximately 0.97 for an energy of 44 keV.

8. The radiation detection apparatus of claim 7, wherein the energy resolution ratio is no greater than approximately 0.95 for the energy of 8 keV.

9. The radiation detection apparatus of claim 7, wherein the energy resolution ratio is no greater than approximately 0.95 for the energy of 13 keV.

10. The radiation detection apparatus of claim 7, wherein the energy resolution ratio is no greater than approximately 0.95 for the energy of 17 keV.

11. The radiation detection apparatus of claim 10, wherein the energy resolution ratio is no greater than approximately 0.95 for the energy of 26 keV.

12. The radiation detection apparatus of claim 7, wherein the energy resolution ratio is no greater than approximately 0.95 for the energy of 22 keV.

13. The radiation detection apparatus of claim 7, wherein an energy resolution ratio is no greater than approximately 0.95 for the energy of 32 keV.

14. The radiation detection apparatus of claim 1, wherein the radiation detection apparatus is a medical imaging system or a well logging apparatus.

15. A radiation detection apparatus comprising:
    a scintillation crystal including $La_{(1-y)}Ce_yBr_3$:Ca, wherein:
        y has a value greater than or equal to 0 and less than 1; and
        the scintillation crystal is formed from a melt having a Ca concentration of at least approximately 0.02 wt. %; and
    wherein for a radiation energy range of 11 keV to 30 keV, the scintillation crystal has an $nPR_{dev\ average}$ of no greater than approximately 8.0%; or
    for a radiation energy range of 30 keV to 60 keV, the scintillation crystal has the $nPR_{dev\ average}$ of no greater than approximately 3.6%; and
    an optical interface optically coupled to the scintillation crystal.

16. The radiation detection apparatus of claim 15, wherein the Ca concentration is no greater than approximately 1.0 wt. %.

* * * * *

UNITED STATES PATENT AND TRADEMARK OFFICE
CERTIFICATE OF CORRECTION

PATENT NO. : 10,564,298 B2
APPLICATION NO. : 16/225193
DATED : February 18, 2020
INVENTOR(S) : Pieter Dorenbos et al.

It is certified that error appears in the above-identified patent and that said Letters Patent is hereby corrected as shown below:

On the Title Page

In Column 2, Item (56), Other Publications, page 2, Line 14, please delete "Growth and Waiter" and insert --Growth and Wafer--

Signed and Sealed this
Tenth Day of May, 2022

Katherine Kelly Vidal
*Director of the United States Patent and Trademark Office*